(12) United States Patent
Kim et al.

(10) Patent No.: US 9,191,656 B2
(45) Date of Patent: Nov. 17, 2015

(54) DISPLAY APPARATUS AND CONTROLLING METHODS THEREOF

(71) Applicant: SAMSUNG ELECTRONICS CO., LTD., Suwon-si (KR)

(72) Inventors: Bong-yeon Kim, Seongnam-si (KR); Chang-seog Ko, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/132,243

(22) Filed: Dec. 18, 2013

(65) Prior Publication Data

US 2014/0104401 A1    Apr. 17, 2014

Related U.S. Application Data

(63) Continuation of application No. 13/731,706, filed on Dec. 31, 2012, now Pat. No. 8,866,892.

(30) Foreign Application Priority Data

Dec. 29, 2011  (KR) .......................... 10-2011-0146163
Oct. 15, 2012  (KR) .......................... 10-2012-0114464

(51) Int. Cl.
*H04N 13/04*    (2006.01)

(52) U.S. Cl.
CPC ....... *H04N 13/0429* (2013.01); *H04N 13/0438* (2013.01); *H04N 13/0497* (2013.01); *H04N 2013/0463* (2013.01); *H04N 2013/0465* (2013.01)

(58) Field of Classification Search
CPC .......... H04N 13/0429; H04N 13/0438; H04N 13/0497; H04N 2013/0463; H04N 2013/0465
USPC .......................................................... 348/56
See application file for complete search history.

(56) References Cited

U.S. PATENT DOCUMENTS

| 6,188,442 B1 | 2/2001 | Narayanaswami |
| 8,269,822 B2 | 9/2012 | Zalewski |

(Continued)

FOREIGN PATENT DOCUMENTS

| CN | 101902588 A | 12/2010 |
| CN | 102237075 A | 11/2011 |

(Continued)

OTHER PUBLICATIONS

Communication, dated Feb. 19, 2013, issued by the Korean Intellectual Property Office in counterpart Korean Patent Application No. 10-2012-0113835.

(Continued)

*Primary Examiner* — Shan Elahi
(74) *Attorney, Agent, or Firm* — Sughrue Mion, PLLC

(57) ABSTRACT

A display apparatus is provided. The display apparatus includes a display unit which outputs a plurality of content views using a plurality of image frames; an interface unit which is connected with a glasses apparatus according to a predetermined communication standard; a synchronization signal generator which generates a synchronization signal that synchronizes one of the plurality of content views with the glasses apparatus; and a controller which, when a glasses apparatus is connected, controls the display apparatus to synchronize the one of the plurality of content views with the glasses.

10 Claims, 20 Drawing Sheets

(56) References Cited

U.S. PATENT DOCUMENTS

| | | | |
|---|---|---|---|
| 8,310,527 | B2 | 11/2012 | Ko et al. |
| 8,325,222 | B2 | 12/2012 | Ko et al. |
| 8,325,223 | B2 | 12/2012 | Ko et al. |
| 8,803,954 | B2 | 8/2014 | Banavara |
| 2004/0257337 | A1 | 12/2004 | Shibamiya et al. |
| 2007/0263003 | A1 | 11/2007 | Ko et al. |
| 2009/0147138 | A1* | 6/2009 | Pawlowski ............ 348/564 |
| 2009/0195641 | A1* | 8/2009 | Neuman ................. 348/47 |
| 2009/0322857 | A1* | 12/2009 | Jacobs et al. .......... 348/42 |
| 2010/0007582 | A1 | 1/2010 | Zalewski |
| 2010/0039504 | A1 | 2/2010 | Takahashi et al. |
| 2010/0157425 | A1 | 6/2010 | Oh |
| 2010/0177172 | A1 | 7/2010 | Ko et al. |
| 2010/0177174 | A1 | 7/2010 | Ko et al. |
| 2010/0182407 | A1 | 7/2010 | Ko et al. |
| 2010/0277485 | A1 | 11/2010 | Zalewski |
| 2010/0306688 | A1 | 12/2010 | Cho et al. |
| 2011/0050870 | A1* | 3/2011 | Hanari ................... 348/56 |
| 2011/0090324 | A1 | 4/2011 | Mentz et al. |
| 2011/0102561 | A1 | 5/2011 | Ichihashi |
| 2011/0116049 | A1 | 5/2011 | Nayar et al. |
| 2011/0149028 | A1 | 6/2011 | Kebanov et al. |
| 2011/0149053 | A1* | 6/2011 | Ito et al. .............. 348/56 |
| 2011/0188582 | A1* | 8/2011 | Price ............... 375/240.26 |
| 2011/0225611 | A1* | 9/2011 | Shintani ............... 725/39 |
| 2011/0249103 | A1* | 10/2011 | Taniguchi .............. 348/56 |
| 2011/0254934 | A1* | 10/2011 | Yoon et al. ............ 348/56 |
| 2011/0254936 | A1* | 10/2011 | MacNaughton et al. ...... 348/56 |
| 2011/0285829 | A1 | 11/2011 | Mori et al. |
| 2011/0285833 | A1 | 11/2011 | Tsurumoto et al. |
| 2011/0285905 | A1 | 11/2011 | Muikaichi et al. |
| 2012/0026396 | A1 | 2/2012 | Banavara |
| 2012/0056876 | A1 | 3/2012 | Lee et al. |
| 2012/0105606 | A1* | 5/2012 | Kim ..................... 348/51 |
| 2013/0033614 | A1 | 2/2013 | Chang |
| 2013/0044263 | A1 | 2/2013 | Choi |

FOREIGN PATENT DOCUMENTS

| | | |
|---|---|---|
| EP | 2 278 818 A2 | 1/2011 |
| EP | 2 378 785 A2 | 10/2011 |
| EP | 2 385 706 A1 | 11/2011 |
| EP | 2 536 155 A2 | 12/2012 |
| JP | 2011-118351 A | 6/2011 |
| JP | 2011-139414 A | 7/2011 |
| JP | 2011-244318 A | 12/2011 |
| KR | 10-2011-0007592 A | 1/2011 |
| KR | 10-2011-0086415 A | 7/2011 |
| KR | 10-2011-0115806 A | 10/2011 |
| WO | 2008/021857 A2 | 2/2008 |
| WO | 2011/099780 A2 | 8/2011 |

OTHER PUBLICATIONS

Communication, dated Mar. 19, 2013, issued by the European Patent Office in counterpart European Patent Application No. 12197602.1.
International Search Report (PCT/ISA/210), dated Mar. 27, 2013, issued by the International Searching Authority in counterpart International Patent Application No. PCT/KR2012/010778.
Written Opinion (PCT/ISA/237), dated Mar. 27, 2013, issued by the International Searching Authority in counterpart International Patent Application No. PCT/KR2012/010778.
European Examination Report issued on Nov. 18, 2013 for European Patent Application No. 12197602.1 filed on Dec. 17, 2012.
Japanese Office Action issued on Nov. 19, 2013 for Japanese Patent Application No. 2012-288492 filed on Dec. 28, 2012.
Communication dated Apr. 17, 2015 issued by European Patent Office in counterpart European Application No. 12197602.1.
Communication dated Jan. 4, 2015, issued by the State Intellectual Property Office of the People's Republic of China in counterpart Chinese Application No. 201210585008.X.

* cited by examiner

FIG. 10A
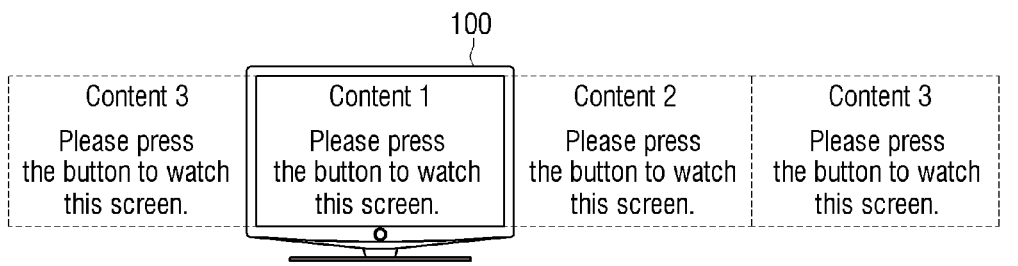
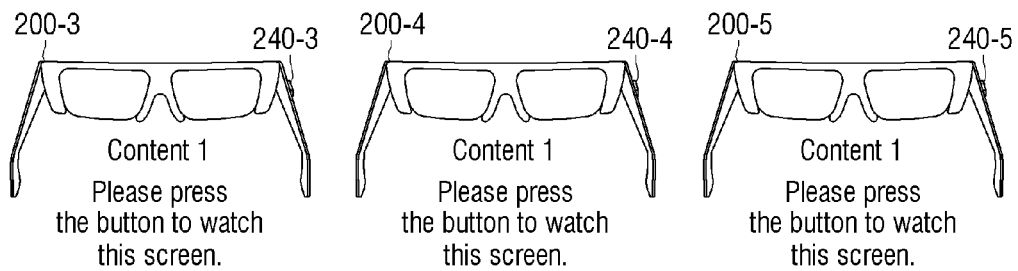
FIG. 10B
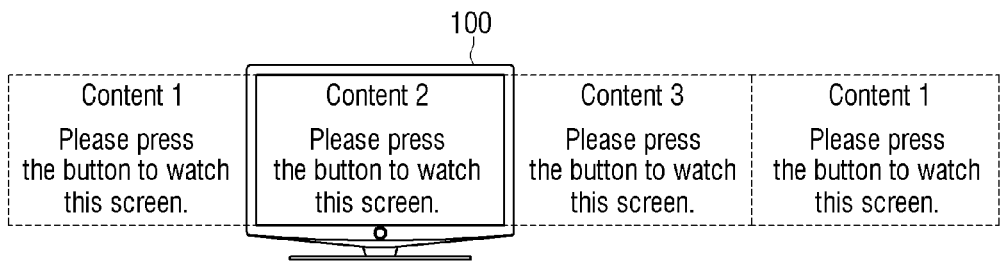
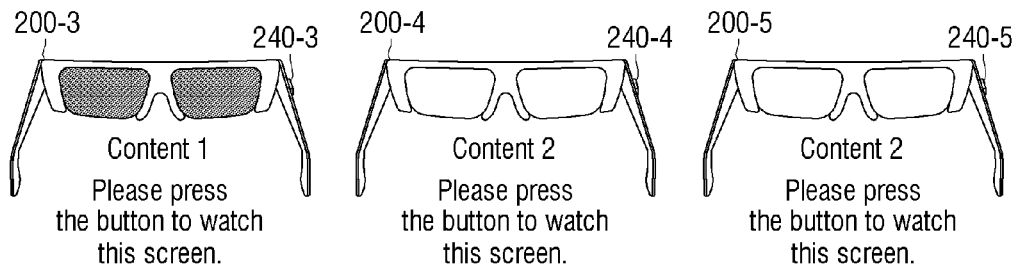

FIG. 20
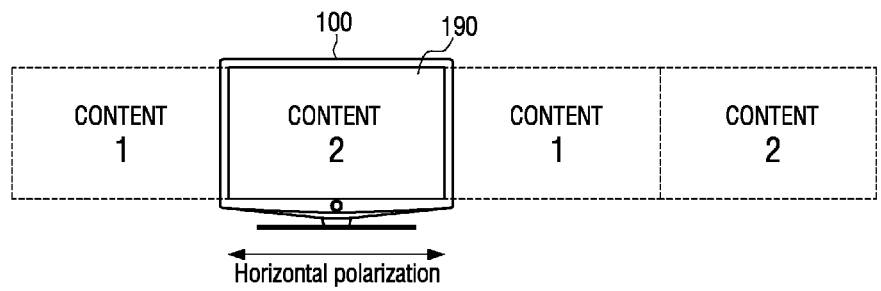
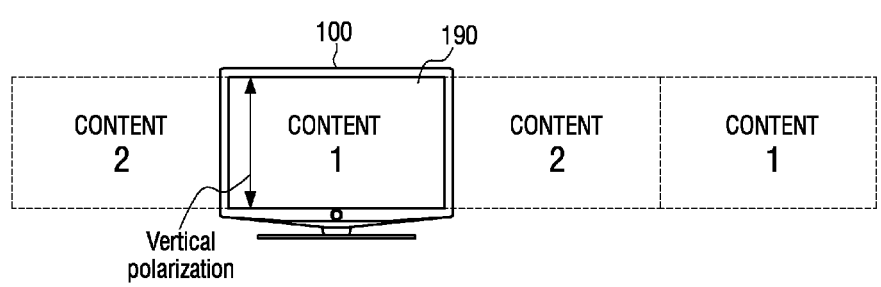
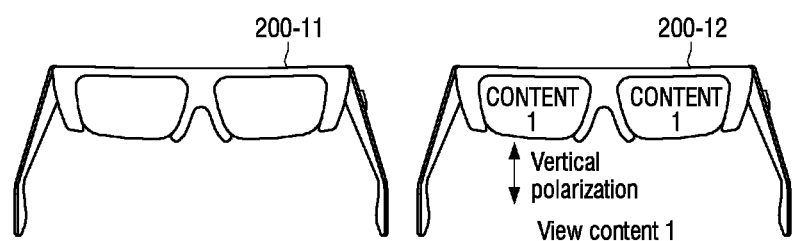

DISPLAY APPARATUS AND CONTROLLING METHODS THEREOF

CROSS-REFERENCE TO RELATED APPLICATIONS

This is a continuation application of U.S. patent application Ser. No. 13/731,706, filed in the U.S. Patent and Trademark Office on Dec. 31, 2012, which claims priority from Korean Patent Application No. 10-2011-0146163, filed Dec. 29, 2011 in the Korean Intellectual Property Office, and Korean Patent Application No. 10-2012-0114464, filed Oct. 15, 2012 in the Korean Intellectual Property Office, the entire disclosures of which are incorporated herein by reference.

BACKGROUND

1. Field

Apparatuses and methods consistent with exemplary embodiments relate to a display apparatus and controlling methods thereof. More particularly, apparatuses and methods consistent with exemplary embodiments relate to a display apparatus for providing different contents to a plurality of users and controlling methods thereof.

2. Description of the Related Art

In accordance with advance of digital technologies, various electronic products are developed and supplied. Particularly, display devices such as televisions (TVs), mobile phones, personal computers (PCs), notebook PCs, tablet devices, smart devices, personal digital assistants (PDAs), etc., are widely used in many households.

As the use of display devices is increasing, user needs for more various operations also increase. Hence, manufacturers have exerted more efforts to meet those user needs and release products with totally new operations such as three-dimensional (3D) content provisions.

Recently, efforts have been made to develop a display apparatus for providing a plurality of contents at the same time so that a plurality of users can watch different contents. Using such a display apparatus with this operation, users who are not familiar with manipulations for controlling this display apparatus cannot know a current situation of the content and a manipulation for a particular situation.

When the plurality of the users views the plurality of the contents, a control command applied to each content and a common control command can exist. When the users are not aware of the respective commands, the control command of a certain user can interrupt the content view of another user.

Hence, there is a need to obtain the status and the operating method of the display apparatus easily and intuitively. There is also a need for a method for controlling the content viewed by the plurality of the users using a single remote control apparatus.

SUMMARY

Aspects of one or more exemplary embodiments solve the above-mentioned and/or other problems and disadvantages and provide a display apparatus which provides different contents to a plurality of users, and more particularly, a display apparatus which effectively controls a plurality of glasses apparatuses connected to the display apparatus and which notifies the users of information on particular situations, and a controlling method thereof.

According to an exemplary embodiment, there is provided a display apparatus which includes a display unit which outputs a plurality of content views using a plurality of image frames; an interface unit which is connected with a glasses apparatus according to a predetermined communication standard; a synchronization signal generator which generates a synchronization signal which synchronizes one of the plurality of content views with the glasses apparatus; and a controller which, when a glasses apparatus is connected to the interface unit, controls the display apparatus to synchronize the one of the plurality of content views with the glasses apparatus.

The display apparatus may further comprising a receiver which receives a plurality of contents; and a signal processor which processes each of the plurality of contents and forms a plurality of image frames.

Herein, the controller may control the display apparatus to synchronize the glasses apparatus with a content view not synchronized with any glasses apparatus of among the plurality of content views, when the glasses apparatus is connected to the interface unit.

Furthermore, the controller may control the display apparatus to display an object which indicates that a content view is not synchronized with any glasses apparatus to the glasses apparatus, when it is determined that there exists a content view not synchronized with a glasses apparatus of among the plurality of content views.

In addition, the plurality of content views may include a main content view and at least one sub content view, and the controller may control the display apparatus to synchronize the glasses apparatus to the main content view, when the glasses apparatus is connected to the interface unit.

In addition, the controller may sequentially synchronize the glasses apparatus with each of the plurality of content views, and when a content view selection command is received from the glasses apparatus, the controller may control the display apparatus to continuously synchronize the glasses apparatus with a content view, synchronized with the glasses apparatus at a point when the selection command is received, from among the plurality of content views Meanwhile, according to an exemplary embodiment, there is provided a controlling method of a display apparatus, the method including outputting a plurality of content views using a plurality of image frames; generating, when a glasses apparatus is connected to the display apparatus, a synchronization signal which synchronizes one of the plurality of content views with the glasses apparatus; and transmitting the synchronization signal to the glasses apparatus.

The controlling method of the display apparatus may further comprises receiving a plurality of contents; and processing each of the plurality of contents and forming a plurality of image frames.

Herein, the generating a synchronization signal may generate a synchronization signal which synchronizes the glasses apparatus with a content view not synchronized with any glasses apparatus of among the plurality of content views, when the glasses apparatus is connected to the display apparatus.

In addition, the controlling method may further include displaying an object which indicates that a content view is not synchronized with any glasses apparatus to the glasses apparatus, when it is determined that there exists a content view not synchronized with a glasses apparatus of among the plurality of content views.

In addition, the plurality of content views may include a main content view and at least one sub content view, and the generating the synchronization signal may generate a synchronization signal which synchronizes the glasses apparatus with the main content view, when the glasses apparatus is connected to the display apparatus.

In addition, the generating a synchronization signal may further include generating a synchronization signal which sequentially synchronizes the glasses apparatus to each of the plurality of content views and when a content view selection command is received from the glasses apparatus, continuously synchronizing the glasses apparatus with a content view synchronized at a point when the selection command is received, from among the plurality of content views.

According to an exemplary embodiment, there is provided a display apparatus, the display apparatus including: an interface which sends and receives information with a glasses apparatus according to a predetermined communication standard; a synchronization signal generator which generates a synchronization signal that synchronizes one of a plurality of content views with the glasses apparatus; and a controller which, when a glasses apparatus is connected to the interface, controls the display apparatus to synchronize one of the plurality of content views with the glasses apparatus.

The controller may control the display apparatus to synchronize the glasses apparatus with a content view, that is not synchronized with another glasses apparatus, from among the plurality of content views.

The controller may control the display apparatus to sequentially synchronize each of the plurality of content views with the glasses apparatus, and when a content view selection command is received from the glasses apparatus while the glasses apparatus is synchronized with one of the plurality of content views, control the display apparatus to continuously synchronize the one of the plurality of content views with the glasses apparatus.

According to an exemplary embodiment, there is provided a controlling method of a display apparatus, the method including: connecting a glasses apparatus to the display apparatus; generating a synchronization signal which synchronizes one of a plurality of content views with the glasses apparatus; and transmitting the synchronization signal to the glasses apparatus.

The generating a synchronization signal may include generating a synchronization signal which synchronizes the glasses apparatus with a content view, that is not synchronized with another glasses apparatus, from among the plurality of content views.

The generating the synchronization signal may include sequentially synchronizing each of the plurality of content views with the glasses apparatus, and when a content view selection command is received from the glasses apparatus while the glasses apparatus is synchronized with one of the plurality of content views, continuously synchronizing the one of the plurality of content views with the glasses apparatus.

According to the aforementioned various exemplary embodiments, a plurality of users may each view different content in one display apparatus, and may intuitively know a state and operating method of the display apparatus. In addition, the aforementioned exemplary embodiments effectively control a glasses apparatus connected to a display apparatus, thereby providing a convenient using environment.

BRIEF DESCRIPTION OF THE DRAWINGS

These and/or other aspects and advantages will become apparent and more readily appreciated from the following description of exemplary embodiments, taken in conjunction with the accompanying drawings of which:

FIGS. 10A and 10B are diagrams of a message object displayed to inquire about whether to synchronize with content according to an exemplary embodiment;

FIG. 20 is a diagram of a situation of viewing content with a glasses apparatus having a polarization lens according to an exemplary embodiment.

DETAILED DESCRIPTION OF EXEMPLARY EMBODIMENTS

Figure 1:
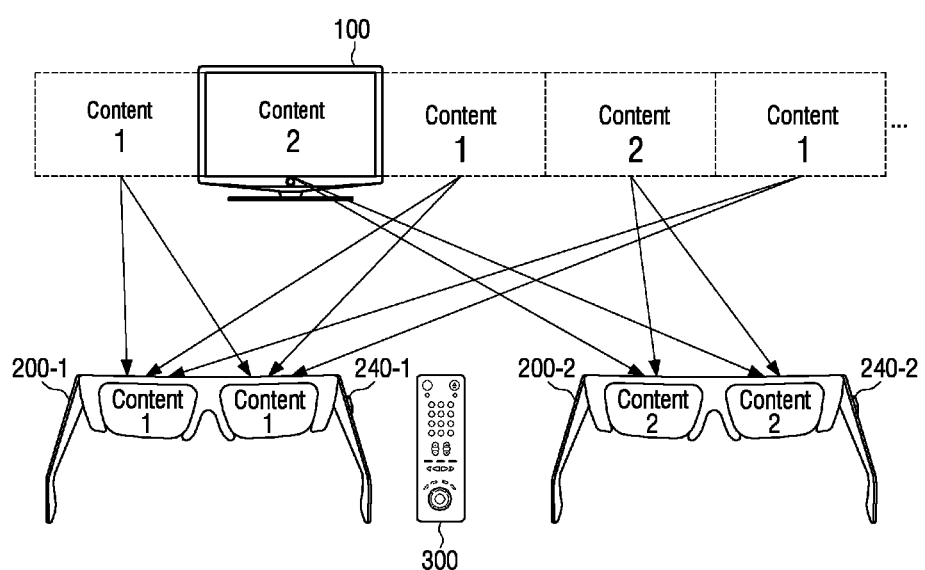
FIG. 1 is a diagram of a display system according to an exemplary embodiment.

Reference will now be made in detail to exemplary embodiments, examples of which are illustrated in the accompanying drawings, wherein like reference numerals refer to the like elements throughout. Exemplary embodiments are described below with reference to the figures.

FIG. 1 is a diagram of a display system according to an exemplary embodiment.

The display system of FIG. 1 includes a display apparatus 100, glasses apparatuses 200, and a remote control apparatus 300.

The display apparatus 100 receives and alternately displays a plurality of contents through a plurality of content views. The display apparatus 100 generates synchronization signals corresponding to the respective content views and sends one of the generated synchronization signals to each of the glasses apparatuses 200-1 and 200-2.

The glasses apparatuses 200-1 and 200-2 receive the respective synchronization signals from the display apparatus 100 and open shutter glasses according to the received respective synchronization signal. Hence, a viewer wearing the glasses apparatus 200-1 can watch a particular content, among the plurality of the content, displayed in the content view synchronized (mapped) with the glasses apparatus 200-1. The glasses apparatuses 200-1 and 200-2 may also each include an input button 240-1 or 240-2, respectively. The input buttons 240-1 or 240-2 may be used to control the content, the display apparatus 100, the respective glasses apparatus 200-1 or 200-2, and/or the remote control apparatus 300. In an aspect of an exemplary embodiment, the input buttons 240-1 and 240-2 may be used to change the content view of their respective glasses apparatus.

The remote control apparatus 300 receives and sends, to the display apparatus 100, a user command for controlling the display apparatus 100. The remote control apparatus 300 detects the closest one of the glasses apparatuses 200-1 and 200-2, and sends a control command to control the content view synchronized with the corresponding glasses apparatus. Alternatively, the display apparatus may be linked to one of the glasses apparatuses 200-1 and 200-2 by a setting or user command input into the remote control apparatus, the display apparatus 100, and/or one of the glasses apparatuses 200-1 and 200-2.

Herein, when image frames of the content are alternately arranged and displayed, the content view indicates a set of image frames of one content viewable by the user wearing one of the glasses apparatuses 200-1 and 200-2. However, the content view is different from the content. For example, when the viewer wearing the glasses apparatus 200-1 synchronized with a particular content view 1 changes a TV channel while watching a content A or watches a content C by playing other DVD content, the content is changed from A to C but the content view 1 is not changed. That is, the content view 1 is a super ordinate concept of the content and contents A and C are similar to channels for content view 1.

As shown in FIG. 1, the display apparatus 100 alternately displays first content and second content through the plurality of the content views. The first glasses apparatus 200-1 receives the synchronization signal corresponding to the first content view and opens the shutter glasses when the first content is displayed, and the viewer wearing the first glasses apparatus 200-1 can watch the first content. The second glasses apparatus 200-2 receives the synchronization signal corresponding to the second content view and opens the shutter glasses when the second content is displayed, and the viewer wearing the second glasses apparatus 200-2 can watch the second content.

While the display apparatus 100 of FIG. 1 displays two separate contents and is connected with two glasses apparatuses 200-1 and 200-2 corresponding to the two content views, it is understood that one or more other exemplary embodiments are not limited thereto. For example, according to one or more other exemplary embodiments, the display apparatus 100 can display three or more content through three or more content views and be connected with three or more glasses apparatuses.

The display apparatus 100 can communicate with the glasses apparatus 200 and the remote control apparatus 300 using various wireless communication technologies such as Wi-Fi, Bluetooth, Infrared Data Association (IRDA), Radio Frequency (RF), IEEE 802.11, WLAN, HR WPAN, UWB, LR WPAN, and IEEE 1394.

Figure 2:
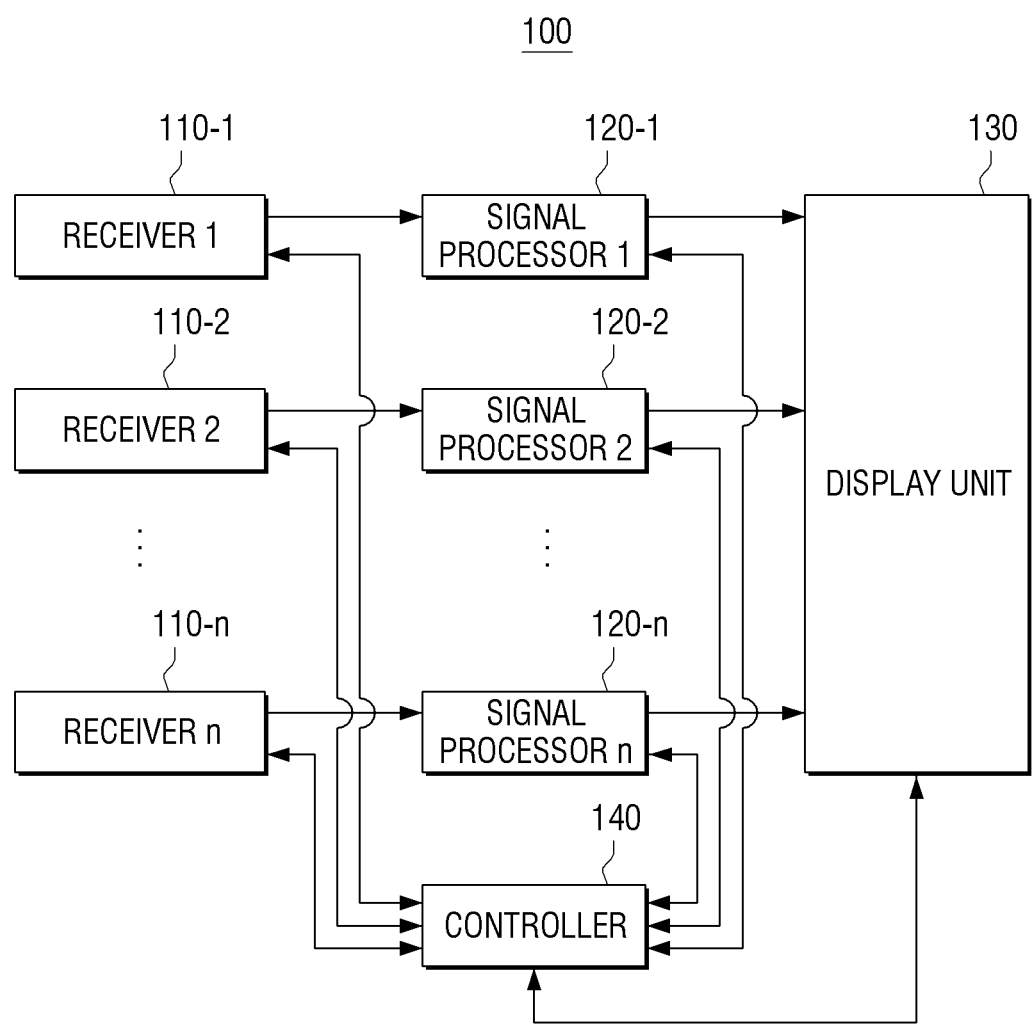
FIG. 2 is a block diagram of a display apparatus according to an exemplary embodiment.

FIG. 2 is a block diagram of a display apparatus 100 according to an exemplary embodiment.

Referring to FIG. 2, the display apparatus 100 includes at least one receiver (e.g., a plurality of receivers 110-1 through 110-*n*), a plurality of signal processors 120-1 through 120-***n*, a display unit 130 (e.g., a display), and a controller 140. The display apparatus 100 can be implemented using various devices including a display unit, such as TV, mobile phone, PDA, notebook PC, monitor, tablet PC, e-book, digital frame, kiosk, smart device, etc.

The at least one receiver (e.g., plurality of receivers 110-1 through 110-*n*) receives a plurality of different content. For example, the plurality of receivers 110-1 through 110-*n* each receive a broadcasting program content from a broadcasting station using a broadcasting network, or receive a content file from a web server using the Internet. The receivers 110-1 through 110-*n* may receive the content from various recording medium players which are embedded in or connected to the display apparatus 100. The recording medium player indicates a device which reproduces the content stored in various recording media such as CDs, DVDs, hard disc, Blu-ray discs, memory cards, USB memory, etc.

When the content is received from the broadcasting station, the receivers 110-1 through 110-*n* can include a tuner (not shown), a demodulator (not shown), and an equalizer (not shown). By contrast, when the content is received from a source such as web server, the receivers 110-1 through 110-*n* can be realized as a network interface card (not shown). When the content are received from various recording medium players, the receivers 110-1 through 110-*n* can be realized as an interface unit (e.g., an interface, input, etc.) (not shown) connected to the recording medium player. As such, the receivers 110-1 through 110-*n* can be implemented in various fashions.

Furthermore, it is understood that the receivers 110-1 through 110-*n* do not necessarily receive the content from sources of the same type, and may receive the content from sources of different types. For example, the first receiver 110-1 may include a tuner, a demodulator, and an equalizer, and the second receiver 110-2 may include a network interface card.

In addition, it is explained in FIG. 2 that the display apparatus 100 includes a plurality of receivers, but a display apparatus 100 may include only one receiver instead, depending on exemplary embodiments. That is, one receiver may receive a plurality of contents. The signal processors 120-1 through 120-*n* can generate image frames by processing the content received by the receivers 110-1 through 110-*n*. The signal processor 120 is explained in more detail by referring to FIG. 3.

Figure 3:
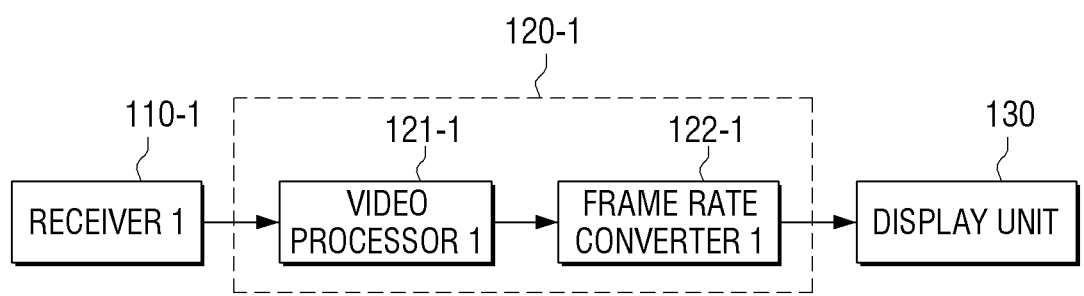
FIG. 3 is a block diagram of a signal processor according to an exemplary embodiment.

FIG. 3 is a block diagram of a signal processor 120 according to an exemplary embodiment.

As shown in FIG. 3, the first signal processor 120-1 includes a first video processor 121-1 and a frame rate converter 122-1. While the first signal processor 120-1 alone is shown in FIG. 3, the same or similar structure of FIG. 3 can be applied to the other signal processors 120-2 through 120-*n*.

The first video processor 121-1 processes video data in the content received from the first receiver 110-1. In detail, the first video processor 121-1 can include a decoder (not shown) for decoding the video data, and a scaler (not shown) for scaling up or down the video data according to a screen size of the display unit 130.

Furthermore, the first video processor 121-1 may convert the video data into a data format corresponding to the first frame rate converter 122-1. For example, when the input video data is in a top-to-bottom format and the first frame rate converter 122-1 processes the frame in a side-by-side format, the first video processor 121-1 can convert the image frames of the content into the side-by-side format by arranging the image frames side-by-side in the horizontal direction.

The first frame rate converter 122-1 converts a frame rate of the content output from the first video processor 121-1 to an output rate of the display apparatus 100. For example, when the display apparatus 100 operates at 60 Hz in a single-view mode, the first frame rate converter 122-1 can convert the frame rate of each content to 60 Hz as in the frame rate of the single-view mode. As for n-ary (e.g., secondary when n=2) content views in a multi-view mode, the display apparatus 100 may operate at the output rate of n*60 Hz. The display apparatus may operate each single-view mode at frequencies other than 60 Hz.

Meanwhile, it is explained in FIG. 2 that the display apparatus includes a plurality of signal processors, but a display apparatus may include only one signal processor instead. That is, one signal processor may process a plurality of contents.

The display unit 130 alternately arranges and displays the image frames of the content generated by the signal processors 120-1 through 120-n. In detail, the display unit 130 multiplexes to alternately arrange and display the image frames of the content output from the signal processors 120-1 through 120-n so that the frames are arranged at least one-by-one. In some cases, the display unit 130 may scale up or down the image frame of the content according to the screen size.

For example, in the display apparatus of a shutter glasses type, the display unit 130 alternately arranges and displays the image frame of the first content, the image frame of the second content, . . . , and the image frame of the n-th content at least one-by-one. The user can watch his/her intended content by wearing the glasses apparatus 200 which interworks at the display timing of the content of the display unit 130. In detail, the glasses apparatus 200 includes a left-eye shutter glass and a right-eye shutter glass. The left-eye shutter glass and the right-eye shutter glass are alternately opened and closed in the 3D content view. Alternatively, when at least one image frame is alternately arranged and displayed, the left-eye shutter glass and the right-eye shutter glass are opened and closed together according to the output timing of the content synchronized with the glasses apparatus 200. Hence, the user can watch the content separately from other users.

As such, the mode for alternately arranging and outputting the image frames of the content can be referred to as a multi-view mode (or a dual-view mode). In a normal mode (or a single-view mode) for displaying either the two-dimensional (2D) content or the 3D content, the display apparatus 100 can process the content by activating only one of the receivers 110-1 through 110-n. When the user selects the multi-view mode in the normal mode, the display apparatus 100 can process the data by activating one or more other receivers 110-1 through 110-n.

Meanwhile, the content can be the 2D content or the 3D content. The 3D content allows the user to feel the depth using a plurality of images representing the same object from different point of views.

When the plurality of the 3D content is used, the display unit 130 can multiplex the left-eye images and the right-eye images of the 3D content provided from the plurality of frame rate converters 122-1 through 122-n based on a preset arrangement, and alternately arrange them with the image frames of the other content.

Hence, the left image and the right image of the first content, the left image and the right image of the second content, . . . , and the left image and the right image of the n-th content are sequentially arranged and displayed. The user perceives the left image and the right image of one of the content through the glasses apparatus 200.

The controller 140 controls the operations of the display apparatus 100. In detail, the controller 140 controls the receivers 110-1 through 110-n, the signal processors 120-1 through 120-n, and the display unit 130 to perform their corresponding operations.

When a predefined event occurs, the controller 140 can control the signal processors 120-1 through 120-n and the display unit 130 to operate according to the event.

Herein, the predefined event can include an event for receiving a control command to control one of the content views from the remote control apparatus 300, an event in which at least one content view is not synchronized with the glasses apparatus 200, an event for inputting a multi-view mode start command, an event for inputting a control authority request command from the remote control apparatus 300, an event for inputting a multi-view mode end command, etc.

The detailed operations of the controller 140 according to the predefined event will be explained below.

Figure 4:
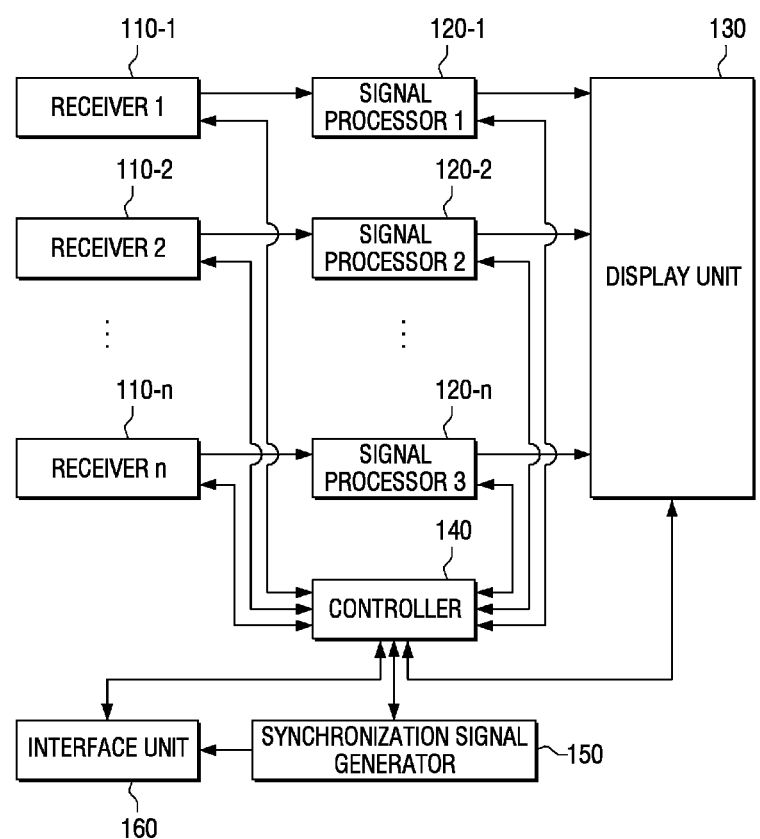
FIG. 4 is a block diagram of a display apparatus according to an exemplary embodiment.

FIG. 4 is a block diagram of a display apparatus 100 according to an exemplary embodiment.

Referring to FIG. 4, the display apparatus 100 includes a plurality of receivers 110-1 through 110-n, a plurality of signal processors 120-1 through 120-n, a display unit 130, and a controller 140, a synchronization signal generator 150, and an interface unit 160. Herein, the controller 140 can control the synchronization signal generator 150 and the interface unit 160 to perform their corresponding operations.

The synchronization signal generator 150 generates a synchronization signal for synchronizing the glasses apparatus 200 to a corresponding content, according to a display timing of the content. That is, the synchronization signal generator 150 generates the synchronization signal for opening the shutter glasses of the glasses apparatus 200 at the display timing of the image frame of the content in the multi-view mode.

The interface unit 160 communicates with the glasses apparatus 200. In so doing, the interface unit 160 can send the synchronization signal to the glasses apparatus 200 and receive a selection command from the glasses apparatus 200 by communicating with the glasses apparatus 200 according to any of various wireless schemes.

For example, the interface unit 160 can include a Bluetooth communication module for communicating with the glasses apparatus 200, generate the synchronization signal as a transport stream according to the Bluetooth communication standard, and send the transport stream to the glasses apparatus 200.

The transport stream transported from the interface unit 160 to the glasses apparatus 100 includes offset time information for opening/closing the shutter glass of the glasses apparatus in synchronization with a reference time and display timing of content. More specifically, the time information may include information on at least one of a left shutter open offset, a left shutter close offset, a right shutter open offset, and a right shutter close offset of the glasses apparatus 200.

The offset is delay information from a reference time to the open or close time of the shutter glass, and may differ according to a frame rate of the display apparatus or a number of content views. That is, when the offset passes from the reference time, the glasses apparatus 200 opens or closes the left shutter glass and the right shutter glass.

In addition, the reference time can be the time point when a vertical synchronization signal (that is, frame sync) is generated in the image frame. The transport stream can include reference time information and also include information of a clock signal used in the display apparatus 100. Thus, the glasses apparatus 200, upon receiving the transport stream, can synchronize its clock signal with the clock signal of the display apparatus 100 and open or close the shutter glasses by determining, using the clock signal, whether the offset passes from the vertical synchronization signal point.

Moreover, the transport stream can further include cycle information of the frame sync, and decimal point information when the cycle of the frame sync has a decimal point.

Hereinbelow is a specific explanation of a synchronization method of the display apparatus 100 and glasses apparatus 200 according to various exemplary embodiments.

According to an exemplary embodiment, the synchronization signal generator 150 may generate a different synchronization signal for each of the plurality of content views, in which case the synchronization signal generator 150 may generate a synchronization signal having a different reference time for each content view or a synchronization signal having a same reference time and a different offset time.

When the glasses apparatus 200 and the display apparatus 100 are connected to each other, the glasses apparatus 200 receives one of the plurality of synchronization signals from the display apparatus 100 and is synchronized with the corresponding content view. Meanwhile, in a case where the user input a command into the glasses apparatus 200 for changing the content view, the glasses apparatus 200 transmits a selection command for selecting a content view to the display apparatus 100. When the display apparatus 100 receives the content view selection command, it may transmit a synchronization signal corresponding to the changed content view to the glasses apparatus 200, thereby changing the content view synchronized with the glasses apparatus 200. For example, the display apparatus may receive a content view selection command from one of a plurality of glasses apparatus and transmit the synchronization signal corresponding to the selected content view to the glasses apparatuses which sends the content view selection command.

According to another aspect of an exemplary embodiment, the synchronization signal generator 150 may generate only one synchronization signal which is used as the reference. Herein, this one synchronization signal which is used as the reference may be a synchronization signal which corresponds to a main content view of among the plurality of content views. When the glasses apparatus 200 and the display apparatus 100 are connected to each other, the glasses apparatus 200 receives the synchronization signal which becomes the reference from the display apparatus 100, and is synchronized with the corresponding content view. Herein, in a case where the user input a command for changing the content view into the glasses apparatus 200, the glasses apparatus 200 may simply change a sync of the synchronization signal which becomes the reference, and be synchronized with another content view.

Meanwhile, the interface unit 160 may conduct pairing based on the Bluetooth communication scheme by transmitting and receiving a Bluetooth address and a PIN code to and from the glasses apparatus 200.

According to an exemplary embodiment, the interface unit 160 may have a plurality of Bluetooth addresses each of which may be connected to one glasses apparatus. Herein, a Bluetooth address may be connected to each glasses apparatus in an ascending or descending order of the order that the glasses apparatuses 200 are connected to the interface unit 160. For a Bluetooth address that is already used to connect with a glasses apparatus 200, the interface unit 160 may set so as to exclude the already connected Bluetooth address from being connected to another glasses apparatus.

When the pairing is completed, information relating to the glasses apparatus 200, for example, identification information of the glasses apparatus 200 or the Bluetooth address used in the pairing can be registered to the interface unit 160. The interface unit 160 matches the information of the glasses apparatus 200 to the transport stream corresponding to the display timing of the content, and sends the transport stream to the glasses apparatus 200 based on the information obtained through the pairing.

When receiving the transport stream, the glasses apparatus 200 can determine whether the transport stream corresponds to its glasses apparatus information, and open or close the glasses according to the time information of the transport stream.

In the present exemplary embodiment, the interface unit 160 and the glasses apparatus 200 communicate with each other according to the Bluetooth communication scheme by way of example. However, it is understood that one or more exemplary embodiments are not limited thereto. For example, according to one or more other exemplary embodiments, the interface unit 160 and the glasses apparatus 200 can adopt other communication schemes such as infrared communication and Zigbee, and various wireless communication schemes for transmitting and receiving signals by building a communication channel within a close range.

It is explained that the interface unit 160 communicates with the plurality of glasses apparatuses by one communication module, but depending on exemplary embodiments, there may be provided a plurality of communication modules which communicate individually with each glasses apparatus. Otherwise, the interface unit 160 may be embodied as one that includes a plurality of communication modules according to each wireless communication method in a case where the display apparatus 100 supports a plurality of wireless communication methods. For example, the interface unit 160 may include a plurality of communication modules according to various wireless communication methods such as Bluetooth, Zigbee, and Wifi etc. In this case, each of the glasses apparatuses 200 may communicate with the display apparatus using different communication modules that are supported by the respective glasses apparatuses.

Although not depicted in FIG. 2, the display apparatus 100 can further include a component for differently providing audio data of the content per user in the multi-view mode. That is, the display apparatus 100 can further include a demultiplexer (not shown) for separating the video data and the audio data from the content received at the receivers 110-1 through 110-n, an audio decoder (not shown) for decoding the separated audio data, a modulator (not shown) for modulating the decoded audio data to different frequency signals, and an audio output unit (not shown) for sending the modulated audio data to the glasses apparatus 200. The audio data output from the audio output unit (not shown) is provided to the user through an output device such as earphones of the glasses apparatus 200.

Meanwhile, in some cases, when the content includes additional information such as Electronic Program Guide (EPG) and subtitle information, the demultiplexer (not shown) may additionally separate the additional data from the content. The display apparatus 100 may add the subtitle processed for the display through an additional data processor (not shown), to the corresponding image frame.

Figure 5:
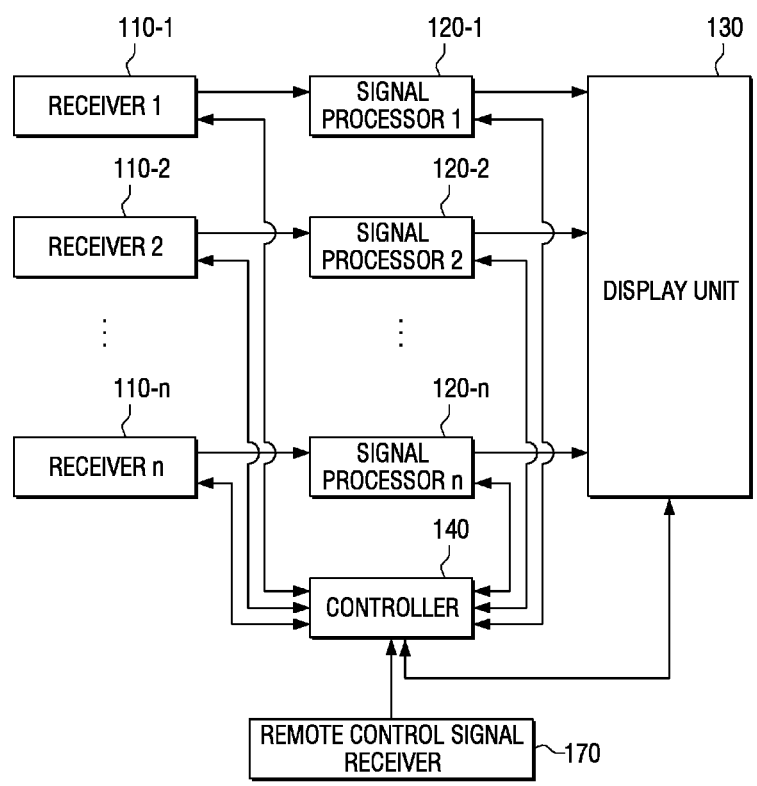
FIG. 5 is a block diagram of a display apparatus according to an exemplary embodiment.

FIG. 5 is a block diagram of a display apparatus 100 according to an exemplary embodiment.

Referring to FIG. 5, the display apparatus 100 includes a plurality of receivers 110-1 through 110-n, a plurality of signal processors 120-1 through 120-*n*, a display unit 130, a controller 140, and a remote control signal receiver 170.

The remote control signal receiver 170 can receive a control command from the remote control apparatus 300. The controller 140 can control the display apparatus 100 according to the control command received from the remote control signal receiver 170.

Figure 6:
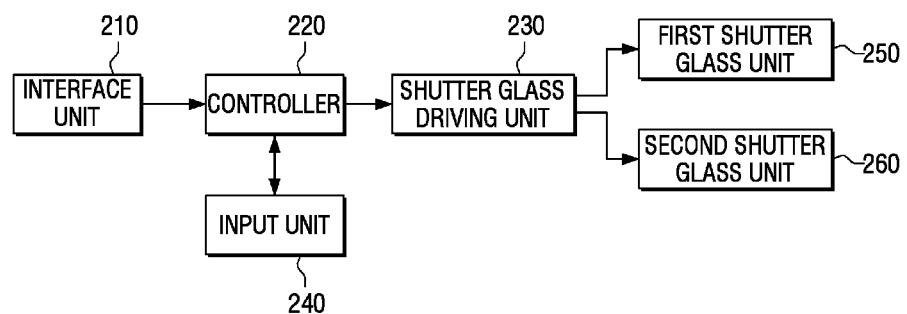
FIG. 6 is a block diagram of a glasses apparatus according to an exemplary embodiment.

FIG. 6 is a block diagram of a glasses apparatus 200 according to an exemplary embodiment.

The glasses apparatus 200 of FIG. 6 interworks with the display apparatus 100 of FIG. 2 which alternately displays the plurality of the content on the image frame basis, and includes an interface unit 210, a controller 220, a shutter glass driving unit 230 (e.g., a shutter glass driver, etc.), an input unit 240 (e.g., an input, input button, etc.), a first shutter glass unit 250 (e.g., a first shutter, etc.), and a second shutter glass unit (e.g., a second shutter, etc.) 260.

The interface unit 210 communicates with the display apparatus 100. For example, the interface unit 210 can be implemented using a Bluetooth communication module for receiving the synchronization signal and sending the information of the glasses apparatus 200 by communicating with the display apparatus 100. The interface unit 210 can send the user command (or the control command) input through the input unit 240 to the display apparatus 100.

As stated earlier, the synchronization signal can be received in the form of a transport stream according to the Bluetooth communication standard, and can include the time information for opening or closing the first shutter glass unit 250 and the second shutter glass unit 260 of the glasses apparatus 200 in synchronization with the display timing of the content. The information included in the transport stream has been exemplarily described in FIG. 4 and shall not be further explained.

The controller 220 controls the operations of the glasses apparatus 200. In particular, the controller 220 controls the shutter glass driving unit 230 by forwarding the synchronization signal received by the interface unit 210 to the shutter glass driving unit 230. That is, based on the synchronization signal, the controller 220 controls the shutter glass driving unit 230 to generate a driving signal to drive the first shutter glass unit 250 and the second shutter glass unit 260.

The shutter glass driving unit 230 generates the driving signal based on the synchronization signal received from the controller 220. In particular, based on the synchronization signal, the shutter glass driving unit 230 can open at least one of the first shutter glass unit 250 and the second shutter glass unit 260 according to the display timing of one of the content displayed by the display apparatus 100.

The first shutter glass unit 250 and the second shutter glass unit 260 open or close the shutter glasses according to the driving signal received from the shutter glass driving unit 230. For example, the first shutter glass unit 250 and the second shutter glass unit 260 open the shutter glasses at the same time when the one of the content that is synchronized with the glasses apparatus is displayed, and close the shutter glasses when a second content not synchronized with the glasses apparatus is displayed. Hence, the user wearing the glasses apparatus 200 can view one content from among a plurality of displayed content without viewing a second content.

Further, when viewing 3D content using the glasses apparatus, the first shutter glass unit 250 and the second shutter glass unit 260 can open and close the glasses in turn. That is, according to the driving signal, the first shutter glass unit 250 can be opened when the left-eye image of a 3D content is displayed and the second shutter glass unit 260 can be opened when the right-eye image is displayed.

The input unit 240 receives a user command for controlling the display apparatus 100. In particular, the input unit 240 can receive a selection command for selecting one of the content views. To this end, the input unit 240 may have a button, touchpad or toggle button etc. for selecting a content view. In a case where the user input a selection command for selecting one of the plurality of content views into the input unit 240, the user may transmit information on the selected content view to the display apparatus 100, and receive the synchronization signal corresponding to the selected content view from the display apparatus 100. The input unit 240 can receive a response signal for confirming or denying the user command or the control command to control one of the content views.

Hereinafter, operations of the display apparatus 100 corresponding to predefined events are illustrated with examples.

<Event for Receiving the Control Command to Control One of the Content Views>

Figure 7:
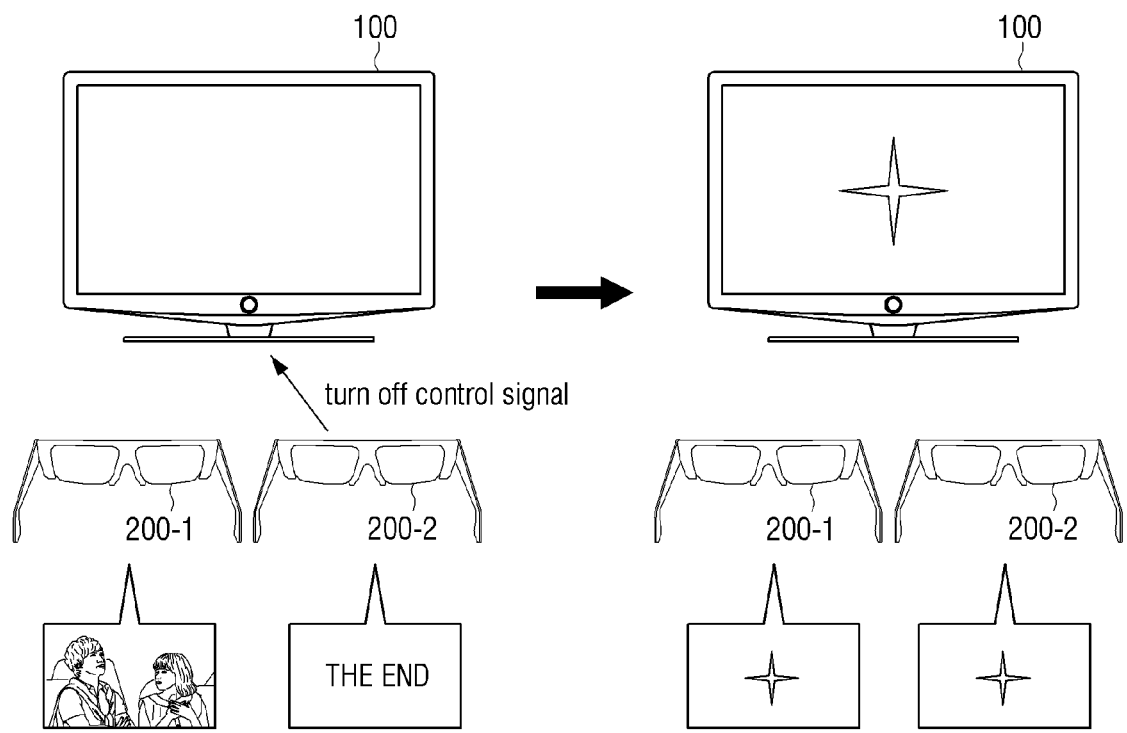
FIG. 7 is a diagram of influence of a control command, received from a remote control apparatus, on another content view.

FIG. 7 is a diagram of influence of a control command received from a remote control apparatus 300 upon another content view.

When a plurality of viewers wear the glasses apparatuses 200-1 and 200-2 synchronized with different content views and one user watching the content inputs the user command to control his/her content view, the user command can affect the user watching the content in the other content view. Since the users watch their own content, they can sometimes control the display apparatus 100 without noticing the other users' content. For example, when the content viewed through one glasses apparatus 200-1 shows the drama series and the movie of the content viewed through the other glasses apparatus 200-2 is over as shown in FIG. 7, the user wearing the other glasses apparatus 200-2 may turn off the display apparatus 100. In this case, the content view of the glasses apparatus 200-1 is affected and, accordingly, it is necessary to inform the other user of the control command input and to seek concurrence of the control according to a type of the control command.

According to an exemplary embodiment, upon receiving the control command to control one of the content views, the controller 140 can selectively display a message informing of the control command input in the other content view according to the type of the control command. As mentioned earlier, when the control command is input to the display apparatus 100 from the glasses apparatus 200-1 and 200-2 watching one content view, the control command can affect the other content view. By contrast, a control command may not affect the other content view at all and the affect, if any, can be ignored. Hence, when receiving the control command from the remote control signal receiver 170, according to the type of the control command, the controller 140 controls to provide notice of the control command input through the other content view or performs the control operation when there is no need to provide notice.

The control command is divided to an executable operation and an execution restriction operation, based on the influence on the other content view. When there is no influence on the other content view, the control command is defined as the executable operation in either case. By contrast, when the other content view is affected, the execution can change according to the agreement or the disagreement of the other user or other conditions. Hence, the control command is defined as the execution restriction operation.

The executable operation indicates the control command when the other content view is not affected as aforementioned. The control command for the executable operation can include a content change command for changing the content of the selected content view, a volume control command for adjusting an audio signal volume of the content, an on-screen display (OSD) menu display command for displaying an OSD menu on the selected content view, and an image quality adjustment control for adjusting the quality of the image frame displayed in the selected content view.

For example, when a volume control signal is input from one glasses apparatus 200 and the volume of the corresponding glasses apparatus 200 is controlled, the other content view is not affected at all. Hence, this volume control operation corresponds to the executable operation. Yet, since the control command for controlling an output volume (master volume) of the display apparatus 100 can affect the other content view, such a control command is the execution restriction operation. For example, as for the content change operation, various content can be viewed through the single content view. Hence, the content change in one content view does not affect the other content views.

The execution restriction operation indicates the control command when the other content view is affected. For example, the execution restriction operation includes a power on/off control operation and an output characteristic control operation of the display apparatus 100. That is, the user watching one content view may turn off the display apparatus 100. In this case, the user can no longer watch the other content view and accordingly the power off control operation corresponds to the execution restriction operation. Further, the output characteristic control operation indicates the control command of dependency of the display apparatus 100. For example, screen brightness can be adjusted or the reception manner can be changed.

Figure 8:
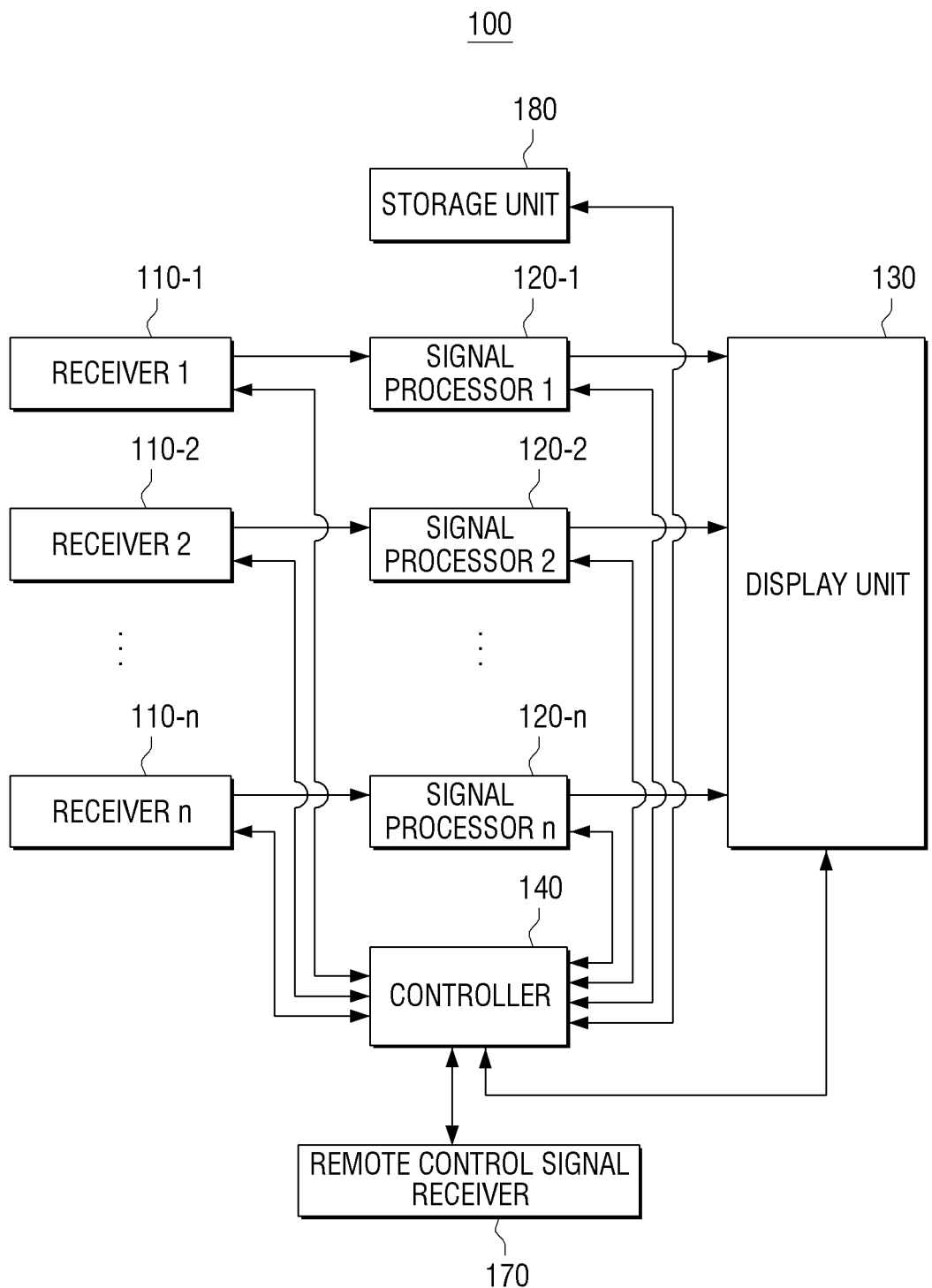
FIG. 8 is a block diagram of a display apparatus according to an exemplary embodiment.

FIG. 8 is a block diagram of a display apparatus 100 according to an exemplary embodiment.

The display apparatus 100 of FIG. 8 distinguishes the executable operation and the execution restriction operation, and can further include a storage unit 180 for storing control operation information divided to the executable operation and the execution restriction operation.

When receiving the control command from the remote control signal receiver 170, the controller 140 can determine whether the received control command is the executable operation or the execution restriction operation by comparing the received control command with the control operation information stored to the storage unit 180.

When the control command pertains to the executable operation, the controller 140 performs the control operation corresponding to the control command for the content view. That is, for the control command to control the volume of the content view, the controller 140 sends the volume control signal without providing notice in the other content view. By contrast, when the control command pertains to the execution restriction operation, the controller 140 controls the signal processor 120 and the display unit 130 to display the message notifying the control command input in the other content view. For example, the signal processor 120 converts the message relating to the control command to image data and mixes the image data with the image frame of the other content view. The display unit 130 outputs the mixed image frame in the other content view. For example, when the power off control signal is input through one content view, a message, "User of the channel No. 1 wants to turn off the display," can be displayed in the other content view.

At this time, the user watching the other content view can send the response signal for agreeing or disagreeing with the control command to the display apparatus 100. For example, the glasses apparatus 200 can receive the signal for agreeing or disagreeing with the control command from the user through the input unit 240 and forward the signal to the display apparatus 100 through the interface unit 210. The user may send the signal through the remote control apparatus 300, or directly input the signal through an input unit (not shown) of the display apparatus 100. In case of the signal input through the input unit 240 of the glasses apparatus 200, when the response signal agreeing with the control command is received from the other glasses apparatus 200 matched to the other content view, the controller 140 executes the control operation corresponding to the control command. When the response signal disagreeing with the control command is received, the controller 140 does not execute the control operation corresponding to the control command. That is, when an input to turn the display apparatus 100 off is received, the controller 140 displays a message, "User of the channel No. 1 wants to turn off the display. Do you agree to it?" in the other content view. When the response signal agreeing with the power off is received from the interface unit 210 of the other glasses apparatus 200 matched to the other content view, the controller 140 turns off the display apparatus 100.

Meanwhile, after a predetermined period of time passes and the display apparatus 100 does not receive a response signal, priority can be granted to the content view of the control command input and the control operation corresponding to the control command can be performed. That is, when receiving no response signal of the control command from the other glasses apparatus 200 matched to the other content view over a preset time starting from the message output time, the controller 140 can execute the control operation corresponding to the control command. However, the priority can be granted to the other content view by considering the influence on the other content view, and thus the disagreement response signal reception may be determined. In this case, no control operation corresponding to the control command is performed. When the control commands are differentiated and no response signal is received, the control operation corresponding to the control command may be executed by determining the disagreement response signal reception with the great influence on the other content view and determining the agreement signal reception with little influence.

In another aspect of an exemplary embodiment, a user of the first content view may be notified that the control command affects the second user of the second content view or a plurality of other users watching a plurality of other content views. The user of the first content view may then be asked to whether the user wants to proceed with the control command and the user may confirm or decline proceeding with the control command. Additionally, in another aspect of an exemplary embodiment, the user of the first content view may only confirm proceeding with the control command if the glasses apparatus synchronized with the first content view has priority over the glasses apparatus synchronized with the second content view.

Accordingly, the execution of the control operation can differ according to the influence of the control command input in one of the content views upon the other content view. Particularly, a more stabilized multi-view display is accomplished by notifying the great influence on the other content view through the other content view and obtaining the agreement on the execution.

<Event when at Least One of the Content Views is not Synchronized with the Glasses Apparatus>

When detecting that content is not connected to a glasses apparatus 200, the controller 140 controls to add and display a message object guiding a connection of the glasses apparatus 200, in the content view not mapped to the glasses apparatus 200, which is explained below with reference to FIG. 9.

Figure 9:
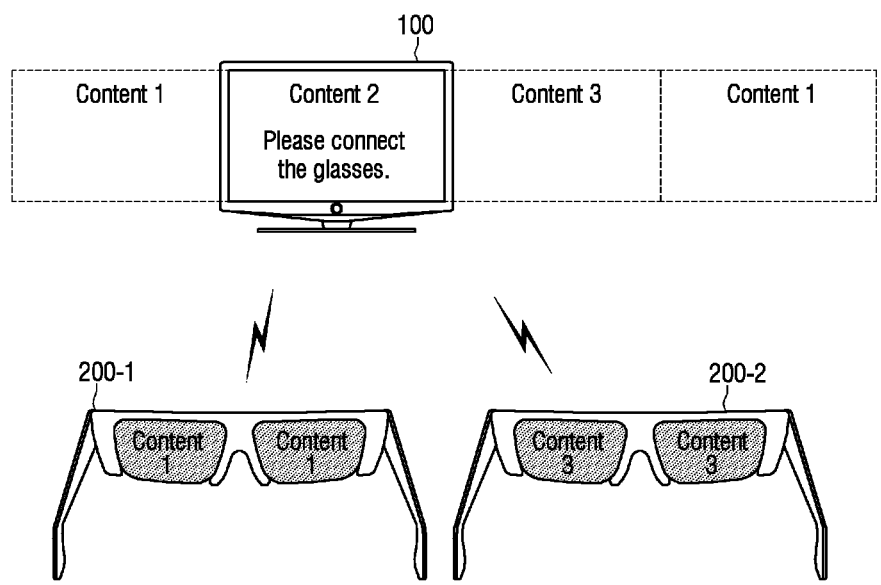
FIG. 9 is a diagram of a message object displayed to guide a connection to a glasses apparatus according to an exemplary embodiment.

FIG. 9 is a diagram of a message object displayed to guide to connect a glasses apparatuses 200 according to an exemplary embodiment.

The glasses apparatuses 200-1 and 200-2 communicate with the display apparatus 100 using their own identification information. When the glasses apparatuses 200-1 and 200-2 are paired with the display apparatus 100, the identification information of the glasses apparatuses 200-1 and 200-2 are transmitted to the display apparatus 100. According to an exemplary embodiment, the Bluetooth address of the interface unit 160 used in the connection with the glasses apparatuses 200-1 and 200-2 may be used as information for identifying the glasses apparatus. According to the identification information received from the glasses apparatuses 200-1 and 200-2 or the Bluetooth address, the interface unit 160 of the display apparatus 100 transmits any one of the synchronization signals corresponding to the content views to the glasses apparatuses 200-1 and 200-2. In so doing, the mapping of information between the content views and the glasses apparatuses 200-1 and 200-2 can be generated or stored.

Herein, the interface unit 160 of the display apparatus 100 can check the mapping information indicating the mapping between the content and the glasses apparatuses 200-1 and 200-2 under the control of the controller 140, and determine whether the content includes content not mapped to the glasses apparatuses 200-1 and 200-2.

Upon detecting the content not synchronized with the glasses apparatuses 200-1 and 200-2, the signal processor 120, among the plurality of the signal processors 120-1 through 120-n, for processing the content not synchronized with the glasses apparatus 200 can add the message object guiding a connection of the glasses apparatus 200, to the image frame of the corresponding content, and the display unit 130 can alternately display the image frame of the added message object with the image frame of the other content.

When a new glasses apparatus 200 is connected, the controller 140 can control to automatically synchronize the new glasses apparatus 200 with the content view not synchronized with the glasses apparatuses 200-1 and 200-2. When the corresponding content view is mapped to at least one glasses apparatus 200 according to the message object guiding the connection of the glasses apparatus 200, the controller 140 may control to make the message object displayed in the corresponding content view disappear.

Referring to FIG. 9, the display apparatus 100 displays the second content, and the glasses apparatuses 200-1 and 200-2 are synchronized with the first content view and the third content view respectively. When the second content is displayed, all of the shutter glasses of the glasses apparatuses 200-1 and 200-2 are closed. Since there are no glasses synchronized with the second content view, the display apparatus 100 can add and display a message object "Please connect the glasses." guiding to connect the second content view and the glasses apparatus 200.

Meanwhile, the viewers wearing the glasses apparatuses 200-1 and 200-2 and watching the first and third content cannot see the message object displayed in the second content, whereas the viewer watching the display screen without the glasses apparatus can see the display screen of the superimposed content images and see the message object added to the second content and superimposed on the other content images. Thus, the viewer watching the display screen without the glasses apparatus 200 can ascertain that part of the current content views are displayed without the synchronization with the glasses apparatuses 200-1 and 200-2.

Herein, when a new glasses apparatus 200 is connected to the display apparatus 100, the new glasses apparatus 200 can be automatically mapped to the second content view which is not mapped to the existing glasses apparatuses 200-1 and 200-2.

The message object guiding the connection of the glasses apparatus 200 can employ not only the message object of FIG. 9 but also any object providing notice that no mapping exists of the corresponding content with the glasses 200. For example, the message object can include a message notifying no mapping, such as, "The glasses are not connected," or a message providing the details of the glasses connection.

Thus, the user can intuitively perceive that the particular content is not currently connected to the glasses apparatus 200 without interrupting the viewer watching the content in the multi-view mode, and the content not connected to the glasses apparatus 200 can be mapped to the new glasses apparatus more easily.

<Event for Inputting the Multi-View Mode Start Command>

When the predefined event is an event for inputting a multi-view mode start command and the multi-view mode start command is input, the controller 140 can control to display the message object inquiring about whether to synchronize the corresponding content view in the image frame of each content view, and to sequentially map the content to the glasses apparatuses 200-1 and 200-2, which is described below with reference to FIGS. 10A and 10B.

FIGS. 10A and 10B depict a message object displayed to inquire about whether to synchronize with the content according to an exemplary embodiment.

When the user inputs the multi-view mode start command, the display apparatus 100 alternately displays the plurality of the content by initiating the multi-view mode. Herein, the signal processors 120-1 through 120-n can add the message object inquiring about whether to map the corresponding content in the image frame of each content, and the display unit 130 can alternately display the image frames of the added object.

The interface unit 160 sequentially displays and maps the content views to glasses apparatuses 200-3, 200-4, and 200-5 connected to the display apparatus 100. Herein, one content view is mapped and/or displayed for a preset time, and when the preset time passes, another content view can be mapped and/or displayed. This applies to the plurality of the glasses apparatuses 200-3, 200-4, and 200-5 connected to the display apparatus 100.

Meanwhile, when receiving the response for the message from at least one glasses apparatus 200, the interface unit 160 can map the content view displayed at the point of the response reception to the at least one glasses apparatus which sends the response. The response to the message indicates a content selection command input through the input unit of the glasses apparatuses 200-3, 200-4, and 200-5 or the remote control apparatus.

Referring to FIG. 10A, the display apparatus 100 alternately displays first, second, and third content, and is currently displaying an image frame of the first content view. A message object, "Please press the button to watch this screen," is added to the image frame of each content. Meanwhile, all of the glasses apparatuses 200-3, 200-4, and 200-5 are mapped to the first content view. When the selection command for selecting the first content currently mapped is input through an input unit 240-3 of the left glasses apparatus 200-3, the left glasses apparatus 200-3 sends the selection command to the display apparatus 100. Even when a preset time interval passes, the communication interface unit 160 of the display apparatus 100 can keep the mapping of the left glasses apparatus 200-3 and the first content.

In FIG. 10B, the glasses apparatuses 200-4 and 200-5 are mapped to the second content view after the preset time passes from FIG. 10A. Yet, since the left glasses apparatus 200-3 is continuously mapped to the first content view by sending the selection command to the display apparatus 100 in FIG. 10A, the viewer wearing the left glasses apparatus 200-3 can keep watching the first content view. Meanwhile, the message object inquiring about the mapping is not added to the image frame of the first content view mapped for the preset time. Hence, the viewer selecting the first content can watch the first content without the interruption of the object when the preset time passes.

When the user inputs the selection command through the input unit 240-4 of the glasses apparatus 200-4 mapped to the second content in FIG. 10B, the glasses apparatus 200-4 sends the selection command to the display apparatus 100 and the communication interface unit 160 of the display apparatus 100 keeps the mapping of the glasses apparatus 200-4 and the second content. Also, when the user inputs the selection command through the input unit 240-5 of the glasses apparatus 200-5 mapped to the second content in FIG. 10B, the glasses apparatus 200-5 sends the selection command to the display apparatus 100 and the communication interface unit 160 of the display apparatus 100 keeps the mapping of the glasses apparatus 200-5 and the second content.

Accordingly, the user can intuitively perceive the start of the multi-view mode and the input of the selection command to view a specific content.

The message object inquiring about the mapping with the corresponding content is not limited to the message object of FIGS. 10A and 10B in one or more other exemplary embodiments. That is, according to one or more other exemplary embodiments, any object that leads to the mapping with the corresponding content may be used. Additionally, a timer indicating the remaining time may be added and displayed in the image frame of the corresponding content so that the user can obtain the remaining time for inputting the selection command to select the content.

<Event when the Glasses Apparatus is Connected>

In a case where a predefined event is an event where the glasses apparatus is connected, when the glasses apparatus 200 is connected to the interface unit 160, the controller 140 may control to synchronize one of the plurality of content views and the glasses apparatus.

According to an exemplary embodiment, as illustrated in FIG. 9, the controller 140 may control so that a newly connected glasses apparatus is synchronized with a content view which is not synchronized with another glasses apparatus of among the plurality of content views. According to another aspect of an exemplary embodiment, in a case where the content views may be differentiated as a main content view and at least one sub content view, the controller 140 may control so that a synchronization is made with the main content view. The main content view may be the content view remaining even when a conversion has been made from a multi view mode into a single view mode. According to another aspect of an exemplary embodiment, as illustrated in FIG. 10, the controller 140 may control so that, when a glasses apparatus is connected, it is synchronized with the plurality of content views sequentially at a predetermined time interval, and when a content view selection command is received from the glasses apparatus, the controller 140 may control so that the glasses apparatus is synchronized with the content view synchronized with the glasses apparatus at the point the selection command was received.

<Event when the Remote Control Apparatus Inputs the Control Authority Request Command>

When the predefined event is an event for inputting a control authority request command from the remote control apparatus 300 and the control authority request command is input, the controller 140 can control to add and display an image object indicating the control authority in the image frame of one of the plurality of the content, which is described below with reference to FIGS. 11A and 11B.

Figure 11A:
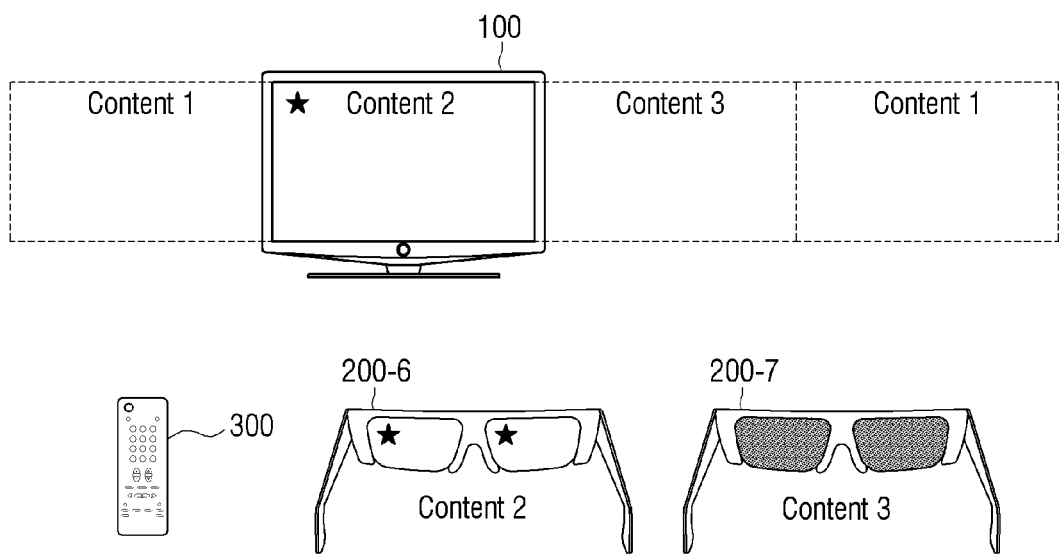
FIGS. 11A and 11B are diagrams of an image object indicating control authority according to an exemplary embodiment.
Figure 11B:
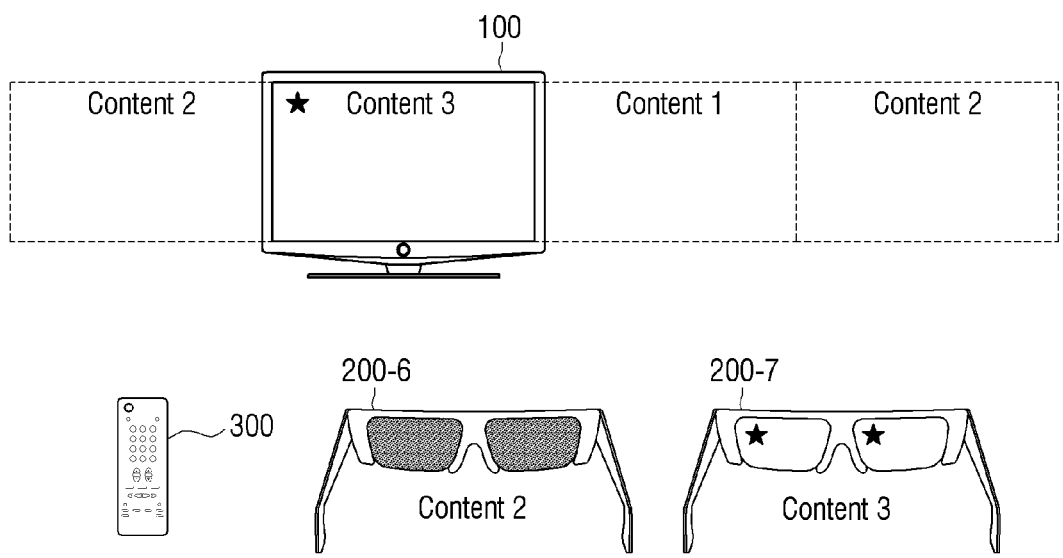

FIGS. 11A and 11B depict an image object indicating a control authority according to an exemplary embodiment.

When the control authority request command is input from the remote control apparatus 300, the image processor for processing the content displayed through the authorized content view among the plurality of the content views of the display apparatus 100 can add an image object indicating the control authority to the image frame of the corresponding content.

The controller 140 can control to sequentially change the content displaying the image object every time the control authority request command is input. That is, when the image object is added and displayed in the image frame of any one the content and the control authority request command is input again from the remote control apparatus 300, the image object indicating the control authority is added and displayed in the image frame of any other content. Every time the control authority request command is input, the content displaying the image object can sequentially change. Hence, the viewer can intuitively perceive the authorized content view with ease.

The control authority request command indicates a user command which is input by the user watching the content through any one of the content views to control the corresponding content view. The control authority request command may be input by pressing or touching a particular button of the remote control apparatus 300, and a command input to control the display apparatus 100, such as a channel change or a volume control button, can be recognized as the control authority request command.

Referring to FIG. 11A, the control authority request is input from the user remote control apparatus 300 and a star-shaped image object indicating the control authority is added and displayed in the image frame of the second content. The viewer wearing the glasses apparatus 200-6 mapped to the second content, who is watching the second content, can perceive the image object indicating the control authority displayed in the display apparatus 100 and control the second content through the remote control apparatus 300. Herein, the control of the second content may correspond to the volume control corresponding to the second content, a display environment setup of the second content, or other content view by changing to other channel when the second content is a broadcasting program.

Meanwhile, the viewer wearing the glasses apparatus 200-7 mapped to the third content view can neither perceive the image object nor control the third content.

Herein, when the user re-inputs the control authority request command, the star-shaped image object indicating the control authority is added and displayed in the image frame of the third content. In FIG. 11B, the display apparatus 100 displays the third content with the object image added and the viewer wearing the glasses apparatus 200-7 can see the image object added to the third content. The viewer watching the second content can neither perceive the image object nor control the second content view.

When the control authority request command is re-input, the star-shaped image object is added and displayed in the image frame of the first content and can sequentially change every time the control authority request command is input.

The image object indicating the control authority can employ not only the star-shaped image object but also any image or text indicating control authority that is perceivable by the viewer. One or more other exemplary embodiments are not limited to the image object but may be applicable to a message object such as "control" indicative of the control authority. When the control authority request command is not re-input over a preset time, the controller 140 may make the image object disappear after the preset time.

The control authority request command may be input through not only the remote control apparatus 300, but also the input unit 240 of the glasses apparatus 200 in one or more other exemplary embodiments. In this case, the image object indicating the control authority can be added and displayed in the content view mapped to the glasses apparatus 200 of the input control authority request command.

<Event for Inputting the Multi-View Mode End Command>

When the predefined event is an event for inputting a multi-view mode end command and the multi-view mode end command is input, the controller 140 can control to add and display a message object notifying the multi-view end in the image frames of all of the content, which is described below with reference to FIG. 12.

Figure 12:
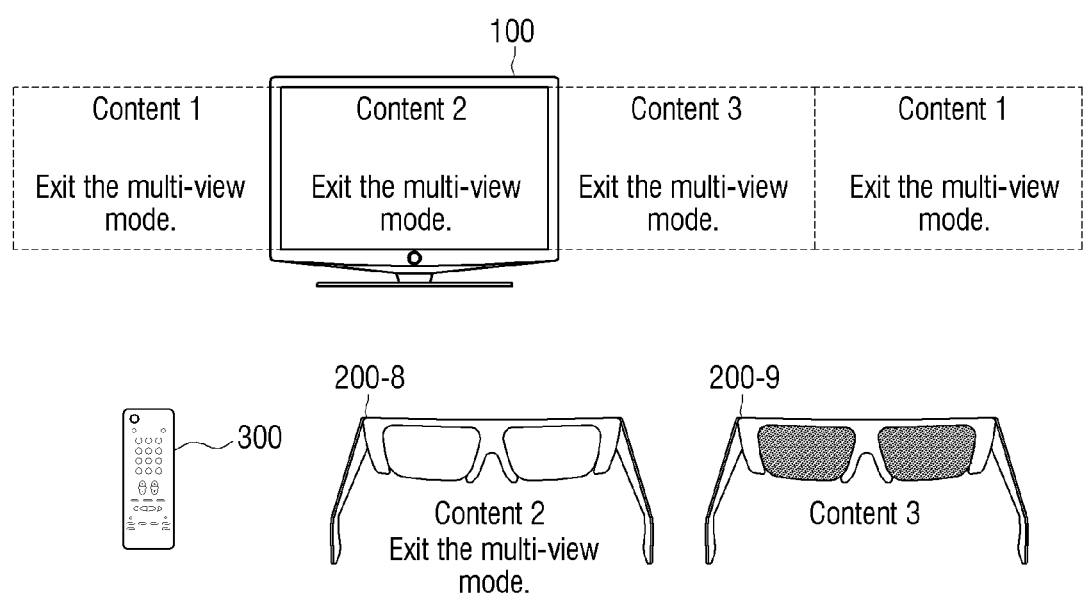
FIG. 12 is a diagram of a message object notifying multi-view end according to an exemplary embodiment.

FIG. 12 depicts a message object notifying a multi-view end according to an exemplary embodiment.

When the multi-view mode end command is input through the remote control apparatus 300, the display apparatus 100 can add and display a message object notifying the multi-view mode end in the image frames of all of the displayed content, and terminate the multi-view mode.

Referring to FIG. 12, when the multi-view mode end command is input through the remote control apparatus 300, the display apparatus 100 adds and displays the message object notifying the multi-view mode end such as, "Exit the multi-view mode," in the image frames of all of the first, second, and third displayed content. Hence, the viewers wearing glasses 200-8 and 200-9 can intuitively learn that the multi-view mode is over.

The multi-view mode end command may be input through not only the remote control apparatus 300, but also the input unit 240 of the glasses apparatus 200 in one or more other exemplary embodiments.

When the multi-view mode is over, only the content displayed before the multi-view mode is displayed and the other content are not displayed any more. However, it is understood that one or more other exemplary embodiments are not limited thereto. For example, according to one or more other exemplary embodiments, only the content of the control authority before the multi-view mode is over may be displayed and the other content may not be displayed.

While the object is, but not limited to, the message object and the image object in the above-described exemplary embodiments, various objects such as an icon, a logo, a text label, and a symbol can be represented in accordance with the predefined event.

The object addition to the image frame in the signal processor 120 can be carried out by the video processor of the image processor, and the frame rate converter may add the object to the image frame of the converted frame rate. Also, the additional data processor for processing the subtitle may add the object. That is, when the content is generated as the image frames, the object can be added in any phase before the content is output to the display unit.

Figure 13:
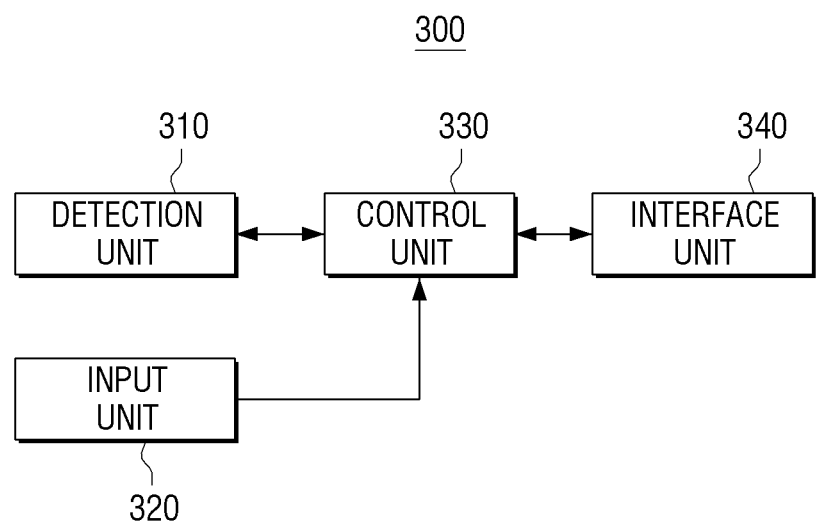
FIG. 13 is a block diagram of a remote control apparatus according to an exemplary embodiment.

FIG. 13 is a block diagram of a remote control apparatus 300 according to an exemplary embodiment.

Referring to FIG. 13, the remote control apparatus 300 includes a detection unit 310 (e.g., a detector), an input unit 320, a control unit 330 (e.g., a controller), and an interface unit 340.

The detection unit 310 receives signals from the plurality of the glasses apparatuses 200 respectively corresponding to the plurality of the content views, detects the glasses apparatus 200 closest to the remote control apparatus 300, and sends the detected signal to the control unit 330 of the remote control apparatus 300.

In more detail, the detection unit 310 can detect distances between the glasses apparatuses 200 and the remote control apparatus 300, and detect the glasses apparatus 200 closest to the remote control apparatus 300 from among the glasses apparatuses 200.

In this case, the detection unit 310 can detect the glasses apparatuses 200 using a sensing method, such as radio frequency identification (RFID) or magnetic sensor, capable of sensing short distances between the remote control apparatus 300 and the glasses apparatuses 200.

Using the RFID of the detection methods, the detection unit 310 can compare the reception strength of radio frequency (RF) signals received from the glasses apparatuses 200, and detect the glasses apparatus 200 transmitting the RF signal of the maximum reception strength as the closest glasses apparatus.

Figure 14:
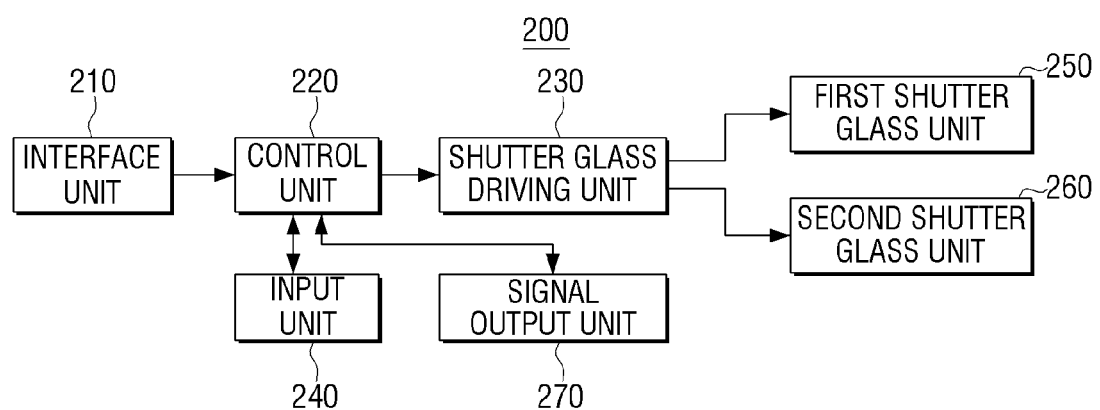
FIG. 14 is a block diagram of a glasses apparatus according to an exemplary embodiment.

The glasses apparatus 200 can further include a signal output unit 270 (see FIG. 14). FIG. 14 is a block diagram of a glasses apparatus 200 according to an exemplary embodiment. The signal output unit 270 of the glasses apparatus 200 can include an RFID tag or a component corresponding to the distance sensing method of the remote control apparatus 300. In detail, when the remote control apparatus 300 senses the distance to each glasses apparatus using the RFID, the signal output unit 270 can include the RFID tag.

The input unit 320 of the remote control apparatus 300 receives the user command. The input unit 320 can employ various input interfaces, such as a keypad, a touch pad, a jog shuttle, a jog stick, a dial, etc., at least alone or in combination, for changing the channel or the audio volume.

When the user selection command is input through the input unit 320, the control unit 330 generates a control signal for controlling the content view corresponding to the closest glasses apparatus 200 detected from among the glasses apparatuses 200, according to the user selection command.

The control signal can include at least one of a glasses apparatus ID, which is the identification information of the closest glasses apparatus 200, or the content view information corresponding to the closest glasses apparatus 200

To this end, the remote control apparatus 300 may receive information on the content view corresponding to the glasses apparatus, from the glasses apparatus. According to an exemplary embodiment, each glasses apparatus may include information on the content view in a signal which is output for sensing distance, and the controller 330 may generate a control signal using information on the content view of the closest glasses apparatus. According to another aspect of an exemplary embodiment, the controller 330 may request a closest glasses apparatus for information on the content view and receive the information when the closest glasses apparatus is determined. Meanwhile, the glasses apparatus 200 and remote control apparatus 300 may transmit/receive information on the content view through the signal output unit 270 and the detection unit 310 for sensing distance, but an interface unit (not illustrated) may be additionally provided for transmitting/receiving information on the content view.

The control command can include, for example, any one of the content change command for changing the content of the content view corresponding to the glasses apparatus 200 closest to the remote control apparatus 300, the volume control command for adjusting the audio signal volume of the content, the OSD menu display command for displaying the OSD menu on the content view, the image quality adjustment control for adjusting the quality of the image frame displayed in the content view, etc.

The interface unit 340 sends the control signal generated by the control unit 330 to the remote control signal receiver 170 of the display apparatus 100. The communication between the interface unit 340 and the remote control signal receiver 170 can adopt a communication scheme such as Bluetooth, infrared communication, and Zigbee, and various wireless communication schemes for transmitting and receiving signals via a communication channel, e.g., a short range communication channel.

In an exemplary embodiment, a user can selectively control the content view mapped to the closest glasses apparatus 200 by changing the location of the remote control apparatus 300 without having to repeatedly input the user command to selectively control one of the content views. Notably, the message or the image object can be added and displayed in the content view currently controllable.

Figure 15:
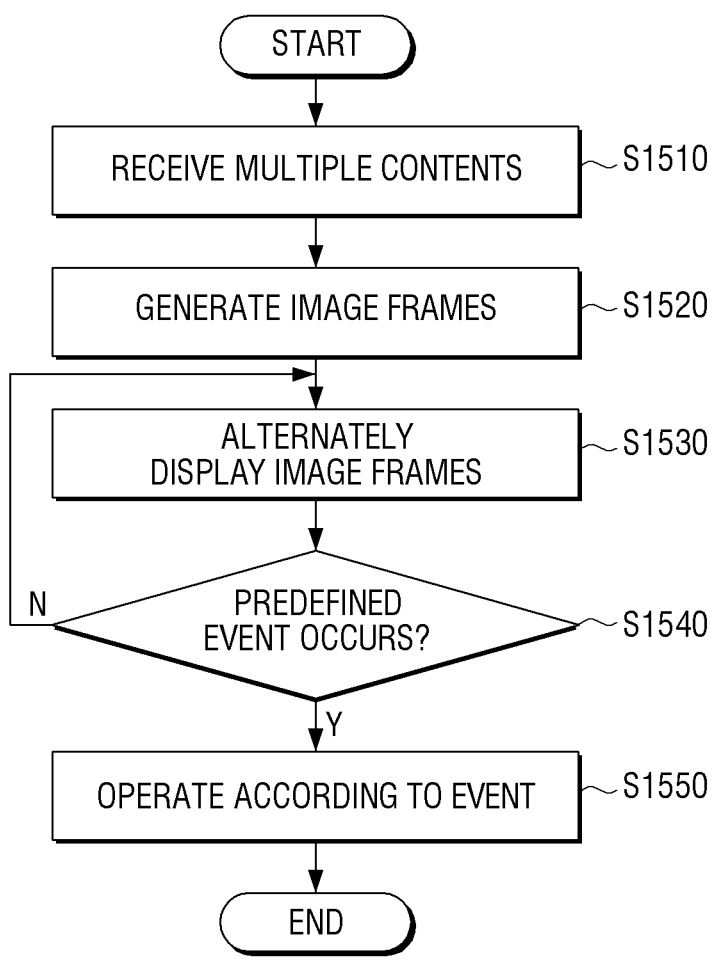
FIG. 15 is a flowchart of a controlling method of a display apparatus according to an exemplary embodiment.

FIG. 15 is a flowchart of a controlling method of a display apparatus 100 according to an exemplary embodiment. Redundant descriptions relating to the display apparatus 100 shall be omitted here.

The display apparatus 100 receives a plurality of the content (operation S1510). More specifically, the display apparatus 100 receives a plurality of the different content. Next, the display apparatus 100 generates the image frames (operation S1520). The display apparatus 100 may generate the image frames by processing the received content. The display apparatus 100 alternately displays the image frames (operation S1530). In particular, the display apparatus 100 generates the plurality of the content views and alternately displays the image frames of the content corresponding to the content views.

Herein, when the predefined event occurs (operation S1540-Y), the display apparatus 100 performs the operation corresponding to the event (operation S1550). The predefined event can include an event for receiving a control command to control one of the content views from the remote control apparatus 300, an event when at least one of the content is not synchronized with the glasses apparatus 200, an event for inputting a multi-view mode start command, the event for inputting a control authority request command from the remote control apparatus 300, an event for inputting the multi-view mode end command, etc. If predefined event does not occur (operation S1540-N), the display apparatus continues to alternately display image frames (operation S1530).

The event for receiving the control command from the remote control apparatus 300 to control one of the content views is explained below with reference to FIGS. 16 and 17.

Figure 16:
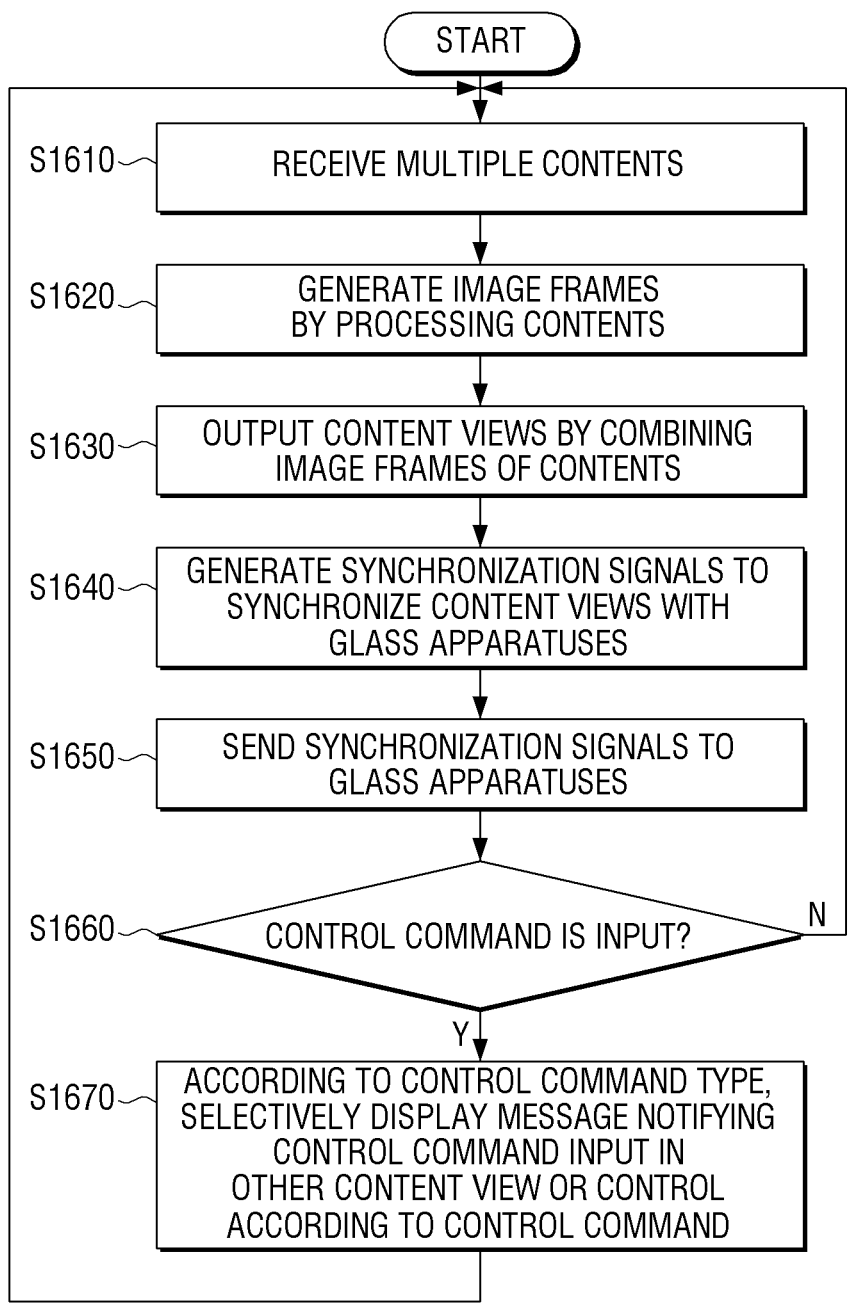
FIG. 16 is a flowchart of a controlling method of a display apparatus according to an exemplary embodiment.

FIG. 16 is a flowchart of a controlling method of a display apparatus 100 according to an exemplary embodiment.

Referring to FIG. 16, the receivers 110 of the display apparatus 100 receive a plurality of contents (operation S1610), and the signal processors 120 generate the image frames by processing the content (operation S1620). The display unit 130 outputs the plurality of the content views by combining the image frames of the content (operation S1630), and the synchronization signal generator 150 generates the synchronization signals to synchronize the content views and the glasses apparatuses 200 (operation S1640). The interface unit 160 transmits the synchronization signals to the glasses apparatuses 200 (operation S1650). When a control command for any one content view is input (operation S1660-Y) while the plurality of the content views is output, the display apparatus 100 determines whether the control command is an executable operation or an execution restriction operation and selectively displays a message notifying other content views of the control command if the control command is execution restriction operation or controls the display apparatus according to the control command if the control command is an executable operation (operation S1670).

Figure 17:
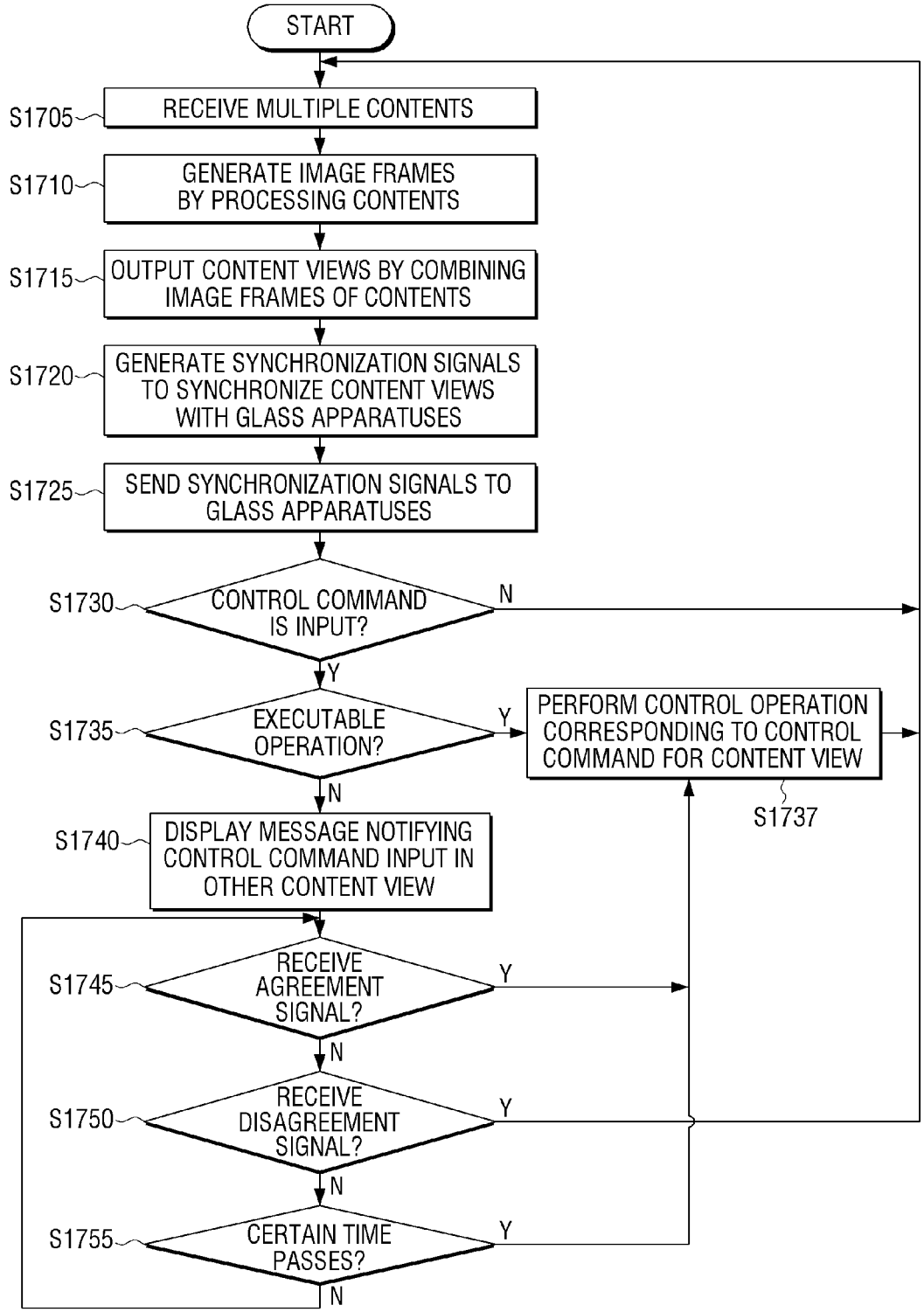
FIG. 17 is a flowchart of a controlling method of a display apparatus according to an exemplary embodiment.

FIG. 17 is a flowchart of a controlling method of a display apparatus 100 according to an exemplary embodiment. Referring to FIG. 17, the receivers 110 of the display apparatus 100 receive a plurality of contents (operation S1705), and the signal processors 120 generate the image frames by processing the content (operation S1710). The display unit 130 outputs the plurality of the content views by combining the image frames of the content (operation S1715), and the synchronization signal generator 150 generates the synchronization signals to synchronize the content views and the glasses apparatuses 200 (operation S1720). The interface unit 160 transmits the synchronization signals to the glasses apparatuses 200 (operation S1725). When a control command for any one content view is input (operation S1730-Y) while the plurality of the content views is output, the display apparatus 100 determines whether the control command is the executable operation. Upon determining the executable operation (operation S1735-Y), the display apparatus 100 executes the operation corresponding to the control command (operation S1737). When determining the execution restriction operation (operation S1735-Y), the display apparatus 100 displays the message notifying the control command input in the other content view (operation S1740). When the agreement signal for the execution restriction operation is received from the glasses apparatus 200 matched to the other content view (operation S1745-Y) or when the agreement signal is not received and no signal is received for a predetermined period of time (operation S1755-Y), the display apparatus 100 executes the operation corresponding to the control command similarly to the executable operation (operation S1737). By contrast, upon receiving the disagreement signal (operation S1750-Y), the display apparatus 100 does not conduct the operation corresponding to the control command.

Meanwhile, when the predefined event is the event when at least one of the content views is not mapped to a glasses apparatus 200 in FIG. 15 and the content views include the content view not mapped to the glasses apparatus 200, the method adds and displays the message object guiding to connect the glasses apparatus 200 in the image frame of at least one content view not mapped to the glasses apparatus 200.

When the predefined event is the event for inputting the multi-view mode start command and the multi-view mode start command is input, the display apparatus 100 adds and displays the message object inquiring about whether to synchronize the corresponding content in the image frame of each content view, and sequentially maps the content to the glasses apparatuses 200. Upon receiving the response to the message from the at least one glasses apparatus 200 or the remote control apparatus 300, the display apparatus 100 can map the content displayed when the response is received, and the glasses apparatus 200 sending the response.

When the predefined event is the event for inputting the control authority request command from the remote control apparatus 300 and the control authority request command is input, the display apparatus 100 adds and displays the image object indicating the control authority in the image frame of one of the content. The content displaying the image object can sequentially change every time the control authority request command is input.

When the predefined event is the event for inputting the multi-view mode end command and the multi-view mode end command is input, the display apparatus 100 adds and displays the message object notifying the multi-view end in the image frames of all of the content.

Figure 18:
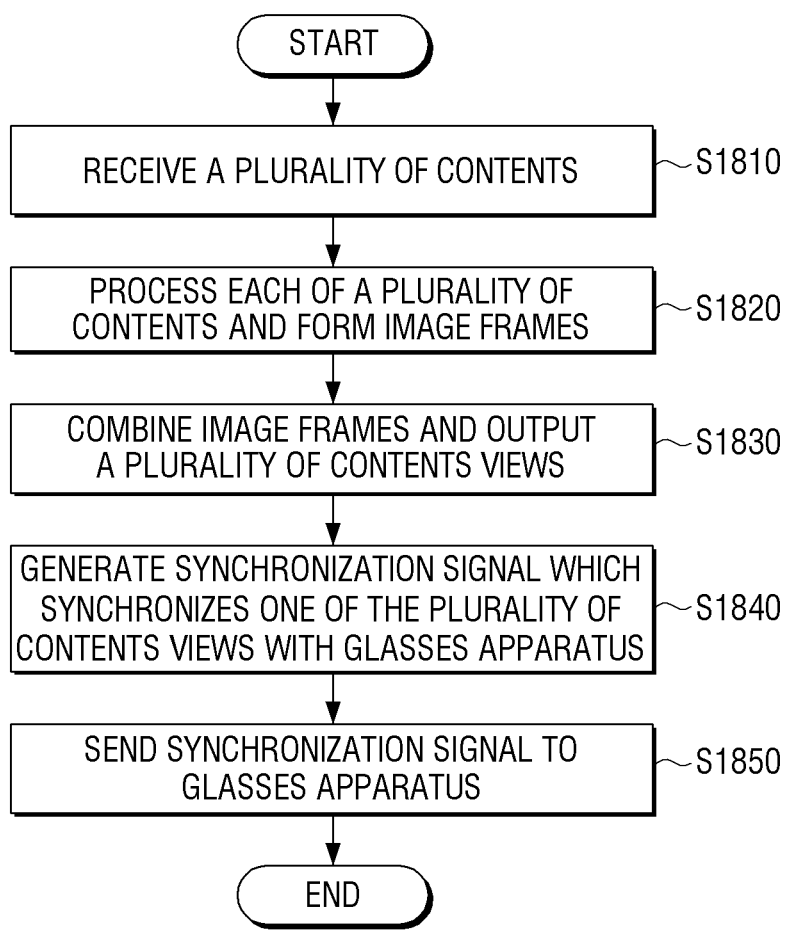
FIG. 18 is a flowchart of a controlling method of a display apparatus according to an exemplary embodiment.

FIG. 18 is a flowchart of a controlling method of a display apparatus according to another exemplary embodiment. In particular, FIG. 18 is a flowchart of a controlling method of a display apparatus in the case of an event where a glasses apparatus is connected.

A plurality of contents is received (operation S1810). Next, an image frame is formed (operation S1820). More specifically, each of the received content is processed to form image frames. In addition, image frames are combined and a plurality of content views is output (operation S1830).

Furthermore, when the glasses apparatus is connected to the display apparatus, a synchronization signal which synchronizes one of the plurality of content views with a glasses apparatus is generated (operation S1840). Herein, generating a synchronization signal may generate a synchronization signal which synchronizes a glasses apparatus with a content view which is not synchronized with any glasses apparatus of among the plurality of content views. Otherwise, in a case where a content view includes a main content view and at least one sub content view, a synchronization signal which synchronizes a glasses apparatus with the main content view may be generated. Otherwise, a synchronization signal which sequentially synchronizes a glasses apparatus with a plurality of content view may be generated.

In addition, a generated synchronization signal is transmitted to a glasses apparatus (operation S1850). In a case where a synchronization signal which sequentially synchronizes a glasses apparatus with the plurality of content views is transmitted, when a content view selection command is received from the glasses apparatus, the glasses apparatus may be continuously be synchronized with the content view synchronized with the glasses apparatus at the point of receiving the selection command. That is, the display apparatus 100 may sequentially transmit a synchronization signal on the plurality of content views, and when a selection command is received from the glasses apparatus 200, the display apparatus 10 may continuously transmit the synchronization signal transmitted at the point of receiving the selection command, to the glasses apparatus 200.

Figure 19:
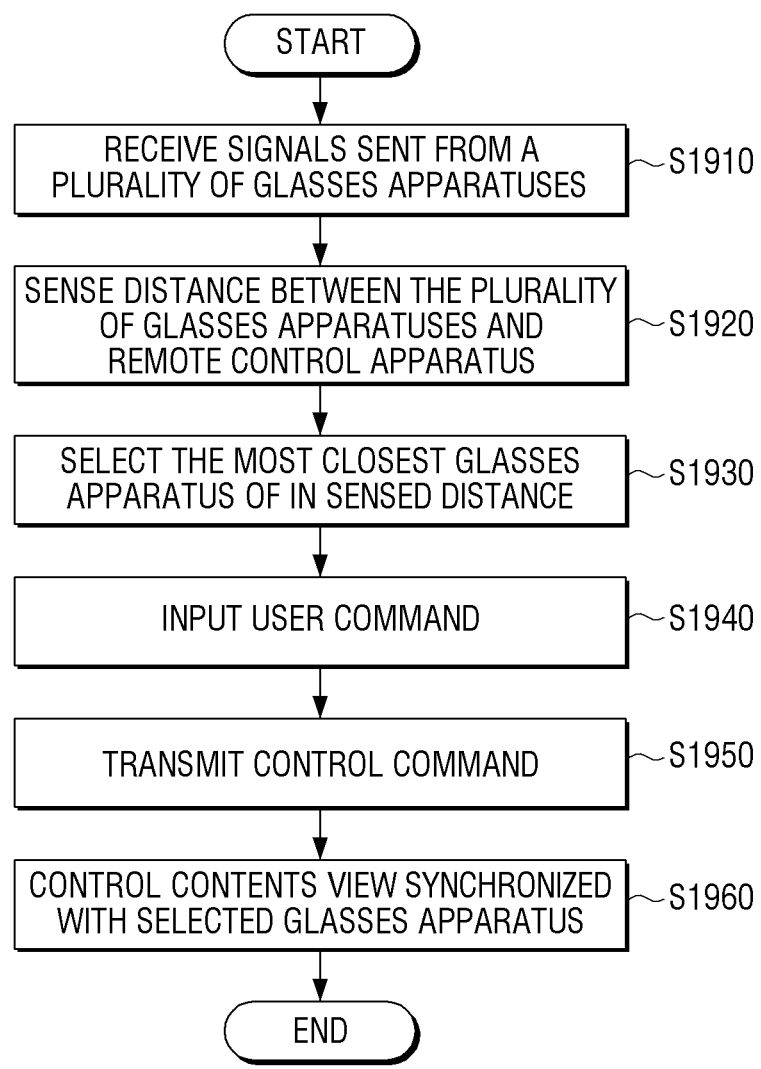
FIG. 19 is a flowchart for explaining a controlling method of a remote control apparatus according to an exemplary embodiment.

FIG. 19 is a flowchart of a controlling method of a remote control apparatus 300 according to an exemplary embodiment.

Referring to FIG. 19, the remote control apparatus 300 receives the signals continuously generated from the glasses apparatuses 200, through the detection unit 310 (operation S1910), and calculates the distances between the remote control apparatuses 300 and the glasses apparatuses 200 by analyzing the signals (operation S1920).

The control unit 330 receives the calculated values from the detection unit 310 and selects the glasses apparatus 200 closest to the remote control apparatus 300 (operation S1930). When the user command is input through the input unit 320 (operation S1940), the control unit 330 generates and transmits the control command to the display apparatus 100 through the interface unit 340 (operation S1950).

The display apparatus 100 receives the control command through the remote control signal receiver 170, and the controller 140 of the display apparatus 100 controls the content view synchronized with the selected glasses apparatus 200 by analyzing the received control command (operation S1960).

As such, when users wearing the glasses apparatuses 200 and watching selected content views at the same time through the display apparatus 100 control their content views, each user can easily control the content and the audio of his/her content view simply by bring the remote control apparatus 300 closer to his/her glasses apparatus 200 than the other glasses apparatuses 200 and inputting the intended control command, without having to separately manipulate the mode in advance.

Meanwhile, a program for executing the methods according to various exemplary embodiments can be stored on various recording media.

Specifically, a code for executing the methods can be stored to various non-volatile recording media such as flash memory, Read Only Memory, (ROM), Erasable Programmable ROM (EPROM), Electronically Erasable and Programmable ROM (EEPROM), hard disc, removable disc, memory card, USB memory, and CD-ROM.

A polarized method according to another exemplary embodiment is described below with reference to FIG. 19.

FIG. 19 depicts a content view using a glasses apparatus 200 including polarization lenses according to an exemplary embodiment.

While the system alternately outputs the image frames of the content and for viewing using shutter glasses according to the above-described exemplary embodiments, it is understood that one or more other exemplary embodiments are not limited thereto. For example, according to another exemplary embodiment, a polarized system may be used for outputting and viewing the content.

In this case, the display apparatus 100 can further include a polarization member 190. The polarization member 190 can include a liquid crystal layer (not shown) for polarizing the image. The display apparatus 100 controls the liquid crystal layer per horizontal line or vertical line using a driving voltage of different levels, and polarizes the output content image in a particular direction. In so doing, the polarized content images can be alternately arranged and output. For example, one content is polarized horizontally and output. In succession, another content is polarized vertically and output. This process is repeated. The users can watch the respective images, that is, the respective content views, through the glasses apparatus 200-3 including horizontal polarization lenses and the glasses apparatus 200-4 including vertical polarization lenses. For example, different regions of one image frame can contain image information of different content. In this case, the regions can be polarized and output in different directions, and the users can watch different content views with the glasses apparatuses 200 including the lenses matched to the polarization directions.

At this time, the glasses apparatuses 200-11 and 200-12 used to view the display apparatus 100 can include the polarization lenses matched to the polarization direction of the content to view. Since the glasses apparatus 200 passes only the polarized images, the user can watch only his/her intended content. The glasses apparatuses 200-11 and 200-12 do not need separate synchronization with the display apparatus 100, economic efficiency can be attained and flicking in the synchronization can be reduced. In FIG. 20, when the images of the content polarized horizontally and vertically are alternately displayed, the glasses apparatuses 200-11 and 200-12 including the corresponding polarization lenses watch the content views.

When the control command for the content view is processed through the polarized display apparatus 100 and glasses apparatus 200, the control command for the content view is output as the image frame of the polarized content. For example, when the control command relates to the execution restriction operation, the message notifying the control command input is polarized in the same manner as the other content image frame and displayed together with the other content view image. Next, the user wearing the glasses apparatus 200 matched to the other content view can input the response for agreeing or disagreeing about the control command to thus control the display apparatus 100.

While the above-described exemplary embodiments relate to a display apparatus 100 including a display unit 130, it is understood that other exemplary embodiments are not limited thereto. For example, other exemplary embodiments may be applicable to an image processing apparatus such as a set-top box, a stand-alone control device, an audio/video receiver, an optical media player, an image source, etc. Furthermore, it is understood that in exemplary embodiments, one or more units of the above-described apparatuses 100, 200, 300 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A display apparatus comprising:
   a display unit;
   an interface which communicates with a glasses apparatus according to a predetermined communication standard;
   a sync signal generator which generates a sync signal that synchronizes one of the plurality of content views with the glasses apparatus; and
   a controller which:
   controls the display apparatus to display a first content view among a plurality of content views with a graphic object indicating start of a multi-view mode and a second content view among the plurality of content views with the graphic object, the second content view being displayed following the first content view;
   in response to receiving a content view selection command from a first glasses apparatus while the graphic object is displayed on the first content view, controls the sync signal generator to generate a first sync signal in order to synchronize the first content view with the first glasses apparatus; and
   in response to receiving a content view selection command from a second glasses apparatus while the graphic object is displayed on the second content view, controls the sync signal generator to generate a second sync signal in order to synchronize the second content view with the second glasses apparatus.

2. The display apparatus according to claim 1, wherein the controller controls the display apparatus to synchronize one or more glasses apparatus connected through the interface with the plurality of content views sequentially at a predetermined time interval.

3. The display apparatus according to claim 2, wherein the controller controls the display apparatus to display a timer object which indicates the remaining time for switching to a next content view in the predetermined time interval.

4. The display apparatus according to claim 1, wherein the controller controls the display apparatus to synchronize the glasses apparatus with a content view not synchronized with another glasses apparatus from among the plurality of content views, in response to connecting to the glasses apparatus through the interface.

5. The display apparatus according to claim 1, wherein the controller controls the display apparatus to display an object which indicates that a content view is not synchronized with any glasses apparatus to the glasses apparatus, in response to determining that there exists a content view that is not synchronized with any glasses apparatus from among the plurality of content views.

6. A controlling method of a display apparatus, the method comprising:
   generating a sync signal which synchronizes a predetermined content view with a glasses apparatus;
   transmitting the sync signal signal to the glasses apparatus; and
   displaying a first content view among a plurality of content views with a graphic object indicating a start of a multi-view mode and a second content view among the plurality of content views with the graphic object, the second content view being displayed following the first content view,
   wherein the generating comprises generating a first sync signal in order to synchronize the first content view with the first glasses apparatus, in response to receiving a content view selection command from a first glasses apparatus while the graphic object is displayed on the first content view, and generating a second sync signal in order to synchronize the second content view with the second glasses apparatus, in response to receiving a content view selection command from a second glasses apparatus while the graphic object is displayed on the second content view.

7. The controlling method according to claim 6, wherein the generating the sync signal generates one or more sync signals which synchronize one or more glasses apparatus connected through the interface with the plurality of content views sequentially at a predetermined time interval.

8. The controlling method according to claim 7, further comprising displaying a timer object which indicates the remaining time for switching to a next content view in the predetermined time interval.

9. The controlling method according to claim 6, wherein the generating the sync signal generates a sync signal which synchronizes the glasses apparatus with a content view not synchronized with any glasses apparatus from among the plurality of content views, in response to the glasses apparatus connecting to the display apparatus.

10. The controlling method according to claim 6, further comprising displaying a graphic object which indicates that a content view is not synchronized with any glasses apparatus to the glasses apparatus in response to determining that there exists a content view that is not synchronized with any glasses apparatus from among the plurality of content views.

* * * * *